US012635702B2

(12) United States Patent (10) Patent No.: US 12,635,702 B2
Bennett et al. (45) Date of Patent: May 26, 2026

(54) COOKING DEVICES WITH SECONDARY SMOKE GENERATION

(71) Applicant: LOGAN OUTDOOR PRODUCTS, LLC, Hyde Park, UT (US)

(72) Inventors: Brett Petersen Bennett, Mantua, UT (US); Ryan Tighe Anderson, Preston, ID (US); Mason Jake Larsen, Smithfield, UT (US); Max Ryan Messerli, Tremonton, UT (US)

(73) Assignee: Logan Outdoor Products, LLC, Hyde Park, UT (US)

( * ) Notice: Subject to any disclaimer, the term of this patent is extended or adjusted under 35 U.S.C. 154(b) by 903 days.

(21) Appl. No.: 17/903,702

(22) Filed: Sep. 6, 2022

(65) Prior Publication Data

US 2023/0140662 A1 May 4, 2023

Related U.S. Application Data

(60) Provisional application No. 63/240,826, filed on Sep. 3, 2021.

(51) Int. Cl.
*A23B 4/052* (2006.01)
*A47J 37/07* (2006.01)
(52) U.S. Cl.
CPC .......... *A23B 4/052* (2013.01); *A47J 37/0704* (2013.01); *A47J 37/0754* (2013.01)
(58) Field of Classification Search
CPC ... A23B 4/052; A47J 37/0641; A47J 37/0704; A47J 37/0709; A47J 37/0713; A47J 37/0754
See application file for complete search history.

(56) References Cited

U.S. PATENT DOCUMENTS

| | | | | |
|---|---|---|---|---|
| 5,891,498 A | * | 4/1999 | Boehler | A23B 4/052 |
| | | | | 126/41 R |
| 7,426,885 B2 | * | 9/2008 | McLemore | A23B 4/052 |
| | | | | 126/59.5 |
| 7,832,390 B2 | | 11/2010 | Hsu et al. | |

(Continued)

FOREIGN PATENT DOCUMENTS

| | | | | |
|---|---|---|---|---|
| WO | WO-2013116946 A1 | * | 8/2013 | F23B 60/02 |
| WO | 2019/157372 | | 8/2019 | |

OTHER PUBLICATIONS

International Search Report and Written Opinion cited in PCT/US2022/042633 dated Dec. 12, 2022, 14 Pages.

(Continued)

*Primary Examiner* — Reginald Alexander
(74) *Attorney, Agent, or Firm* — Reed Smith LLP; Amardeep S. Grewal

(57) ABSTRACT

A cooking device including a cooking chamber comprising at least one cooking surface, a wood pellet burner positioned below the cooking chamber and configured to combust wood pellets and provide a first source of smoke, a wood pellet hopper configured to store a supply of wood pellets, an auger configured to feed wood pellets to the wood pellet burner, and a secondary solid fuel combustion unit removably inserted into the cooking device below the cooking chamber and configured to combust a second solid fuel and provide a second source of smoke.

13 Claims, 37 Drawing Sheets

(56)                 References Cited

U.S. PATENT DOCUMENTS

| 10,188,120 | B2 | 1/2019 | Cohen |
| 12,089,780 | B2 | 9/2024 | Konrath |
| 2018/0368617 | A1† | 12/2018 | Allmendinger |
| 2020/0196798 | A1† | 6/2020 | Boltz |
| 2020/0214304 | A1* | 7/2020 | Garces .................. A23B 4/052 |
| 2021/0267413 | A1 | 9/2021 | Roberts et al. |

OTHER PUBLICATIONS

Examination Report for Canada Application No. 3,230,766, dated Feb. 21, 2025, 4 pages.
Examination Report No. 1 for Australia Application No. 2022340698, dated Apr. 9, 2025, 3 pages.
Fire Magic Smoker/Wood Chip Box Assembly for Echelon Diamond Grills (Pre 2017), Robert H. Peterson Co., https://www.firemagicstore.com/fire-magic-smoker-wood-chip-box-assembly-for-echelon-diamond-grills.html.†
TX Griller, Cuisinart Woodcreek Pellet Grill—Charcoal Insert Part 2, 1 page, YouTube, Feb. 12, 2020, https://www.youtube.com/watch?v=1bQY7WI2x8g&t1s.†
Cuisinart Woodcreek 4-in-1 Pellet Grill Owner's Manual for Models SMKL0036AS/SMK0036ASO, 17 pages, 2019, The Boltz Group LLC, Carrolton, TX.†
Kalamazoo Hybrid Fire Grills Use and Care Guide, 90 pages, 2015, Kalamazoo Outdoor Gourmet, LLC, Chicago, IL.†
Solaire Infrared Grill Care and Use Manual—27 Inch Grill, 2003, Rasmussen Iron Works, Inc., Whittler, CA.†
FireMagic Echelon Diamond Series Outdoor Stand-Alone Gas Grill E660s, E790s, and E1060s Installation Instructions and Owner's Manual, 46 pages, Robert H. Peterson Co., City of Industry, CA.†

* cited by examiner
† cited by third party

101

104

106B

106A

101A

101B

104

101B         101A

105

105A                    105

105A        105

105A          105

101C

101B

101A

101A

101B

101B 101B        101D 106            107

101B 101D                    106                    107

101B

101D

106

108

301B

301C 301B                    301C

COOKING DEVICES WITH SECONDARY SMOKE GENERATION

RELATED APPLICATION DATA

This application claims priority to U.S. Provisional Application No. 63/240,826, filed Sep. 3, 2021, the disclosure of which is hereby incorporated by reference in its entirety.

BACKGROUND

Smokers and pellet grills are cooking devices that combust solid fuels, such as wood pellets, to product smoke and heat to cook food. However, in many cases, users wish to smoke food with multiple types of smoke from different sources (e.g., different types of wood) for more complex flavors. In these situations, users have to improvise an approach to allow for a second type of smoking, such as by filling a container with a second type of solid fuel, igniting the solid fuel manually, and then inserting the container into the grill or smoker. This method is cumbersome and does not provide the user with any control over the smoke produced by the second solid fuel source. Accordingly, improvements are needed in cooking devices to permit secondary smoke generation.

SUMMARY

According to an exemplary embodiment, the disclosed cooking device includes a cooking chamber including at least one cooking surface, a wood pellet burner positioned below the cooking chamber and configured to combust wood pellets and provide a first source of smoke, a wood pellet hopper configured to store a supply of wood pellets, an auger configured to feed wood pellets to the wood pellet burner, and a secondary solid fuel combustion unit removably inserted into the cooking device below the cooking chamber and configured to combust a second solid fuel and provide a second source of smoke.

According to this exemplary embodiment, the cooking device can be a smoker or a pellet grill. Additionally, the cooking surface can include a plurality of cooking surfaces. The secondary solid fuel combustion unit can be removably inserted into a receiving aperture/opening integrated into the cooking device and configured to receive the secondary solid fuel combustion unit.

According to this exemplary embodiment, the secondary solid fuel combustion unit can be a removable smoke box configured to slide into and out of an opening/aperture in the cooking device or can be an integrated smoke tube configured to slide into and out of an opening/aperture in the cooking device.

According to an exemplary embodiment, the disclosed cooking device is a wood pellet grill and includes a cooking surface including one or more cooking racks, a wood pellet burner positioned below the cooking surface and configured to combust wood pellets and provide a first source of smoke, a wood pellet hopper configured to store a supply of wood pellets, an auger configured to feed wood pellets to the wood pellet burner, a secondary solid fuel combustion unit removably inserted into the cooking device below the cooking chamber and configured to combust a second solid fuel and provide a second source of smoke, the secondary solid fuel combustion unit being removably inserted into a receiving aperture integrated into the cooking device and configured to receive the secondary solid fuel combustion unit, and a hot rod tube integrated into the cooking device and configured to ignite the second solid fuel within the secondary solid fuel combustion unit.

According to this exemplary embodiment, the secondary solid fuel combustion unit can be a pellet tube. The pellet tube can be rotatable within the receiving aperture via a handle located on the external housing. The pellet tube can include a plurality of holes distributed along a body of the pellet tube such that rotation of the pellet tube alters an airflow through the pellet tube (and a burn rate of pellets/solid fuel inside the tube).

According to this exemplary embodiment, the pellet tube can include a dimple that protrudes through a slot in the receiving aperture, the slot being shaped to restrict movement of the dimple beyond a predetermined angle and prevent further rotation the pellet tube.

According to this exemplary embodiment, the hot rod tube can also be further configured to pass through the wood pellet burner and ignite wood pellets in the wood pellet burner. Therefore a single hot rod tube/igniter can be used to ignite both the pellets in the wood pellet burner and any pellet/wood chips/solid fuel in the pellet tube.

According to this exemplary embodiment, the pellet grill can further include a burner housing enclosing the wood pellet burner and one or more openings in the burner housing configured to blow air onto the pellet tube and thereby keep pellets/solid fuel within the tube smoldering.

According to an exemplary embodiment, the cooking device can include an external housing, a cooking chamber within the external housing, a wood pellet burner positioned below the cooking chamber and configured to combust wood pellets and provide a first source of smoke, a wood pellet hopper configured to store a supply of wood pellets, an auger configured to feed wood pellets to the wood pellet burner, a secondary solid fuel combustion unit removably inserted into the cooking device below the cooking chamber and configured to combust a second solid fuel and provide a second source of smoke, the secondary solid fuel combustion unit being removably inserted into a receiving aperture integrated into the cooking device and configured to receive the secondary solid fuel combustion unit, and a valve disposed above the wood pellet burner and below the secondary solid fuel combustion unit, wherein the wood pellet burner is further configured to combust the second solid fuel in the secondary solid fuel combustion unit when the valve is in the open position.

According to this exemplary embodiment, the valve can be a butterfly valve and the cooking device can further include a handle on the external housing configured to actuate the butterfly valve.

According to this exemplary embodiment, the cooking device can include a housing configured to receive the secondary solid fuel combustion unit, the housing comprising a ceiling configured to seal the secondary solid fuel combustion unit when the secondary solid fuel combustion unit is completely inserted into the receiving aperture.

According to this exemplary embodiment, the cooking device can be a smoker and the cooking chamber can include a plurality of cooking racks.

According to this exemplary embodiment, the cooking device can be a pellet grill and the cooking chamber can include at least one cooking rack.

According to this exemplary embodiment, the cooking device can include a drip tray configured to route smoke produced by the wood pellet burner and smoke produced by secondary solid fuel combustion unit to the sides of the cooking device.

BRIEF DESCRIPTION OF THE DRAWINGS

FIGS. 22-23 illustrate the back end of the cooking device without a bracket.

DETAILED DESCRIPTION

Figure 1:
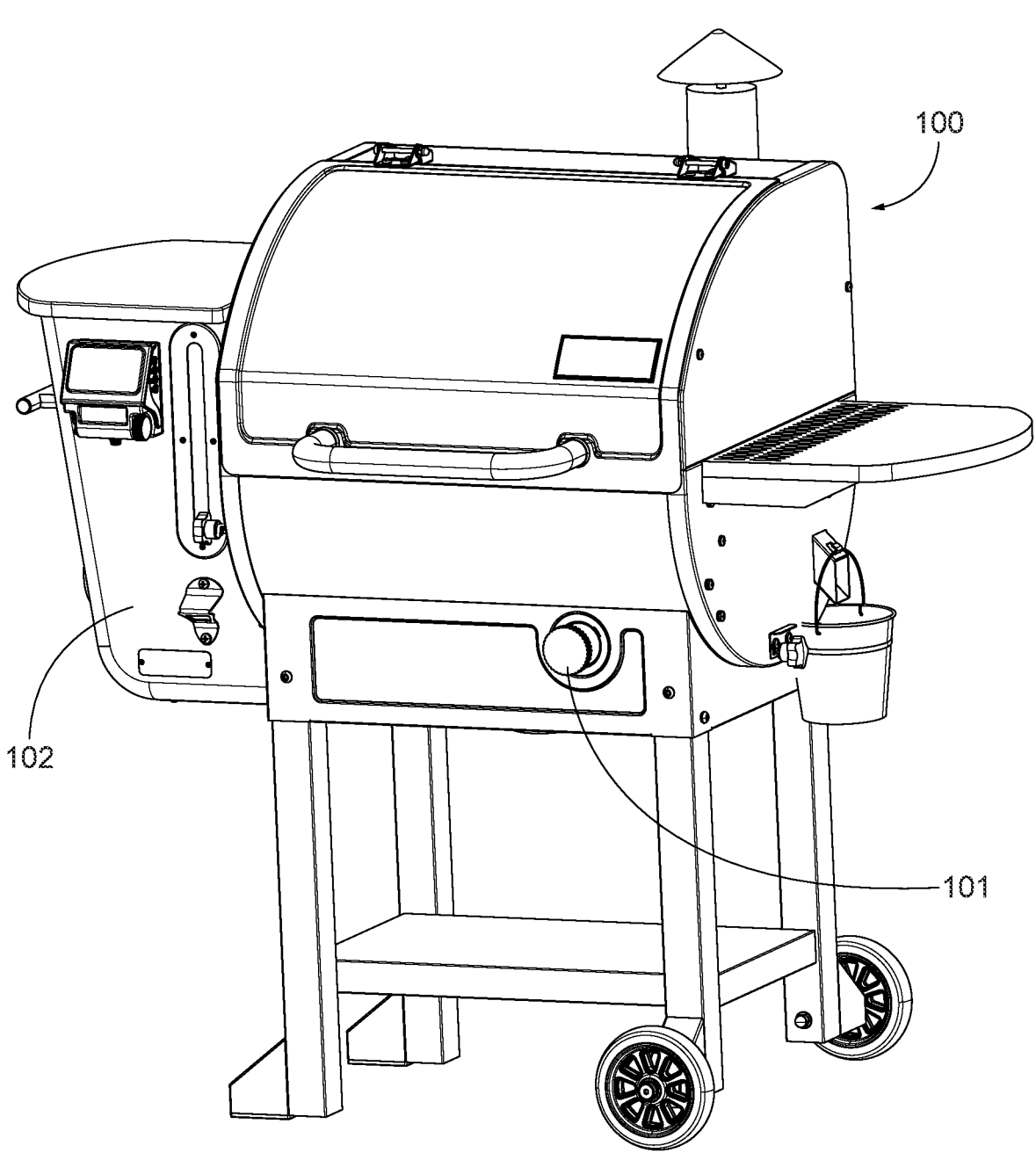
FIGS. 1-4 illustrate a cooking device with secondary smoke generation according to an exemplary embodiment.

Applicant has discovered novel cooking devices with secondary smoke generation. The disclosed cooking devices includes a cooking chamber having at least one cooking surface and a solid fuel combustion unit positioned below the cooking chamber and configured to combust a first solid fuel and provide a first source of smoke. The at least one cooking surface can be plurality of cooking surfaces, such as multiple wire racks.

Disclosed cooking devices additionally include a secondary solid fuel combustion unit removably inserted into the cooking device below the cooking chamber and configured to combust a second solid fuel and provide a second source of smoke.

According to an exemplary embodiment, explained in greater detail with respect to FIGS. 1-37, the disclosed cooking device includes a cooking chamber including at least one cooking surface, a wood pellet burner positioned below the cooking chamber and configured to combust wood pellets and provide a first source of smoke, a wood pellet hopper configured to store a supply of wood pellets, an auger configured to feed wood pellets to the wood pellet burner, and a secondary solid fuel combustion unit removably inserted into the cooking device below the cooking chamber and configured to combust a second solid fuel and provide a second source of smoke.

According to this exemplary embodiment, the cooking device can be a smoker or a pellet grill. Additionally, the cooking surface can include a plurality of cooking surfaces. The secondary solid fuel combustion unit can be removably inserted into a receiving aperture/opening integrated into the cooking device and configured to receive the secondary solid fuel combustion unit.

The secondary solid fuel combustion unit can be a removable smoke box configured to slide into and out of an opening/aperture in the cooking device or can be an integrated smoke tube configured to slide into and out of an opening/aperture in the cooking device.

According to an exemplary embodiment, explained in greater detail with respect to FIGS. 1-24, the disclosed cooking device is a wood pellet grill and includes a cooking surface including one or more cooking racks, a wood pellet burner positioned below the cooking surface and configured to combust wood pellets and provide a first source of smoke, a wood pellet hopper configured to store a supply of wood pellets, an auger configured to feed wood pellets to the wood pellet burner, a secondary solid fuel combustion unit removably inserted into the cooking device below the cooking chamber and configured to combust a second solid fuel and provide a second source of smoke, the secondary solid fuel combustion unit being removably inserted into a receiving aperture integrated into the cooking device and configured to receive the secondary solid fuel combustion unit, and a hot rod tube integrated into the cooking device and configured to ignite the second solid fuel within the secondary solid fuel combustion unit.

According to this exemplary embodiment, the secondary solid fuel combustion unit can be a pellet tube. The pellet tube can be rotatable within the receiving aperture via a handle located on the external housing. The pellet tube can include a plurality of holes distributed along a body of the pellet tube such that rotation of the pellet tube alters an airflow through the pellet tube (and a burn rate of pellets/solid fuel inside the tube).

According to this exemplary embodiment, the pellet tube can include a dimple that protrudes through a slot in the receiving aperture, the slot being shaped to restrict movement of the dimple beyond a predetermined angle and prevent further rotation the pellet tube.

According to this exemplary embodiment, the hot rod tube can also be further configured to pass through the wood pellet burner and ignite wood pellets in the wood pellet burner. Therefore a single hot rod tube/igniter can be used to ignite both the pellets in the wood pellet burner and any pellet/wood chips/solid fuel in the pellet tube.

According to this exemplary embodiment, the pellet grill can further include a burner housing enclosing the wood pellet burner and one or more openings in the burner housing configured to blow air onto the pellet tube and thereby keep pellets/solid fuel within the tube smoldering.

According to an exemplary embodiment, explained in greater detail with respect to FIGS. 25-37, the cooking device can include an external housing, a cooking chamber within the external housing, a wood pellet burner positioned below the cooking chamber and configured to combust wood pellets and provide a first source of smoke, a wood pellet hopper configured to store a supply of wood pellets, an auger configured to feed wood pellets to the wood pellet burner, a secondary solid fuel combustion unit removably inserted into the cooking device below the cooking chamber and configured to combust a second solid fuel and provide a second source of smoke, the secondary solid fuel combustion unit being removably inserted into a receiving aperture integrated into the cooking device and configured to receive the secondary solid fuel combustion unit, and a valve disposed above the wood pellet burner and below the secondary solid fuel combustion unit, wherein the wood pellet burner is further configured to combust the second solid fuel in the secondary solid fuel combustion unit when the valve is in the open position.

The valve can be a butterfly valve or any other kind of open/closed valve and the cooking device can further include a handle on the external housing configured to actuate the butterfly valve.

According to this exemplary embodiment, the cooking device can include a housing configured to receive the secondary solid fuel combustion unit, the housing comprising a ceiling configured to seal the secondary solid fuel combustion unit when the secondary solid fuel combustion unit is completely inserted into the receiving aperture.

According to this exemplary embodiment, the cooking device can be a smoker and the cooking chamber can include a plurality of cooking racks. This configuration is explained with respect to FIGS. 25-29.

According to this exemplary embodiment, the cooking device can be a pellet grill and the cooking chamber can include at least one cooking rack. This configuration is explained with respect to FIGS. 30-37.

According to this exemplary embodiment, the cooking device can include a drip tray configured to route smoke produced by the wood pellet burner and smoke produced by secondary solid fuel combustion unit to the sides of the cooking device.

The cooking device can be a smoker, as explained in greater detail with respect to FIGS. 25 to 29. The cooking device can also be a grill, such as a pellet grill, as explained in greater detail with respect to FIGS. 1-24 and 30-37.

The secondary solid fuel combustion unit can be removably inserted into a receiving aperture integrated into the cooking device and configured to receive the secondary solid fuel combustion unit. The receiving aperture can be a drawer, a tube, a hollow opening, and/or any other type of opening that is integrated into the cooking device.

The secondary solid fuel combustion unit can be a removable smoke box configured to slide into and out of an opening in the cooking device, as shown in FIGS. 25-37.

The secondary solid fuel combustion unit can also be an integrated smoke tube configured to slide into and out of an opening in the cooking device, as shown in FIGS. 1-24. Although not illustrated, it is understood that an integrated smoke tube, such as the one shown in FIGS. 1-24, can be utilized with a smoker, such as the one shown in FIGS. 25-29.

Figure 2:
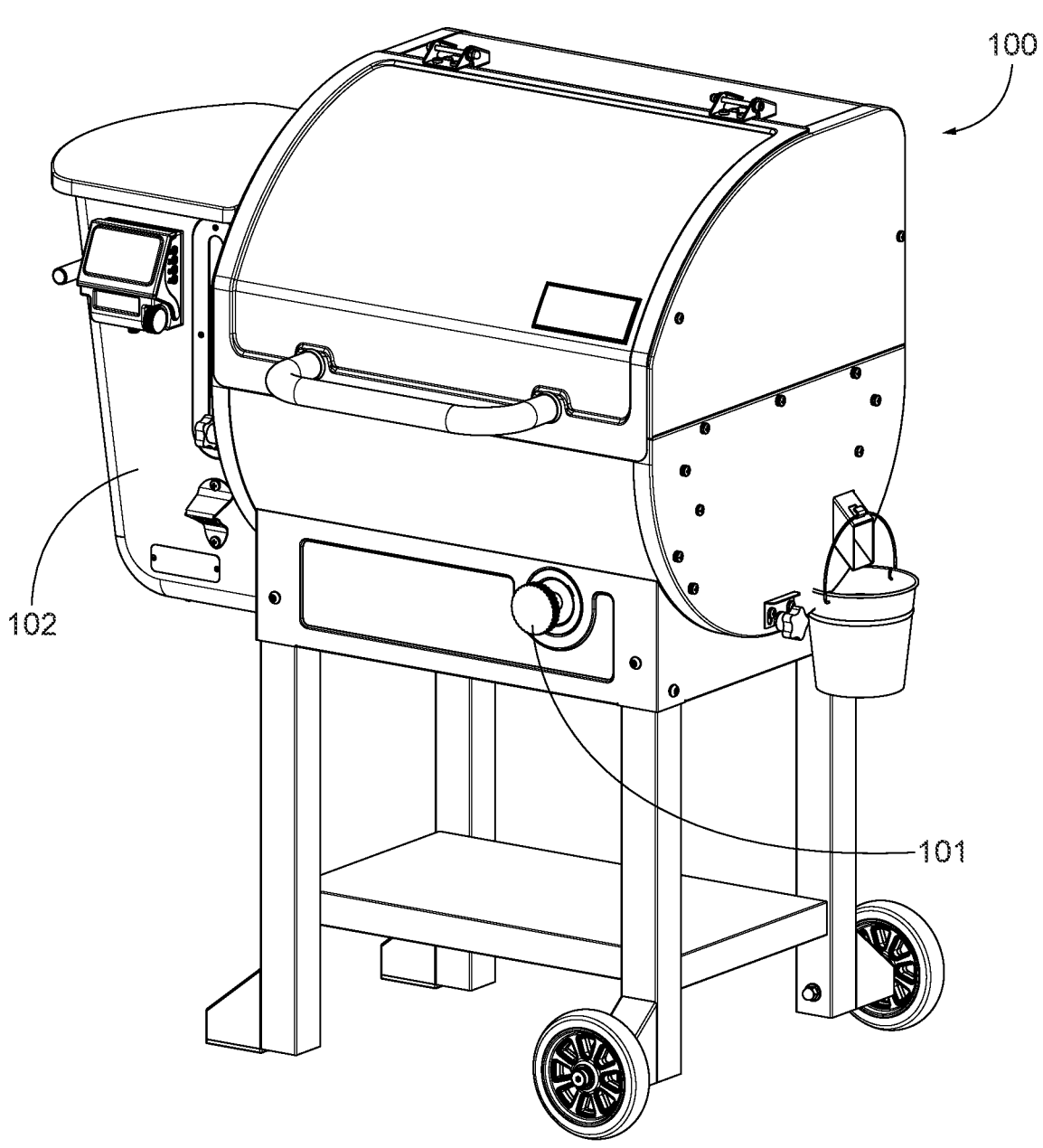

FIGS. 1-24 illustrate a cooking device with secondary smoke generation according to an exemplary embodiment. As shown in FIGS. 1-2, the cooking device is a pellet grill 100 and includes a pellet hopper 102 that stores combustible fuel pellets that are supplied to the burner. The pellet grill 100 additionally includes a secondary solid fuel combustion unit in the form of integrated pellet tube 101.

Figure 3:
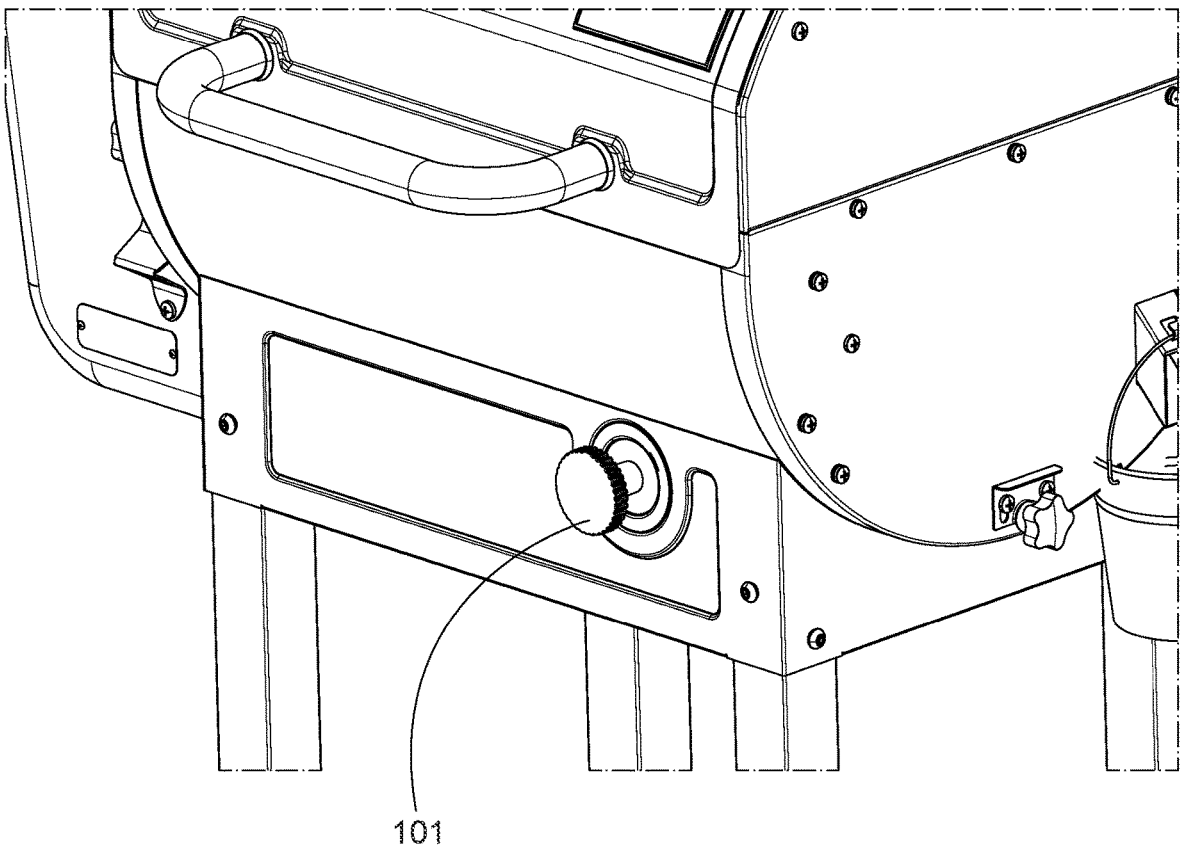
Figure 4:
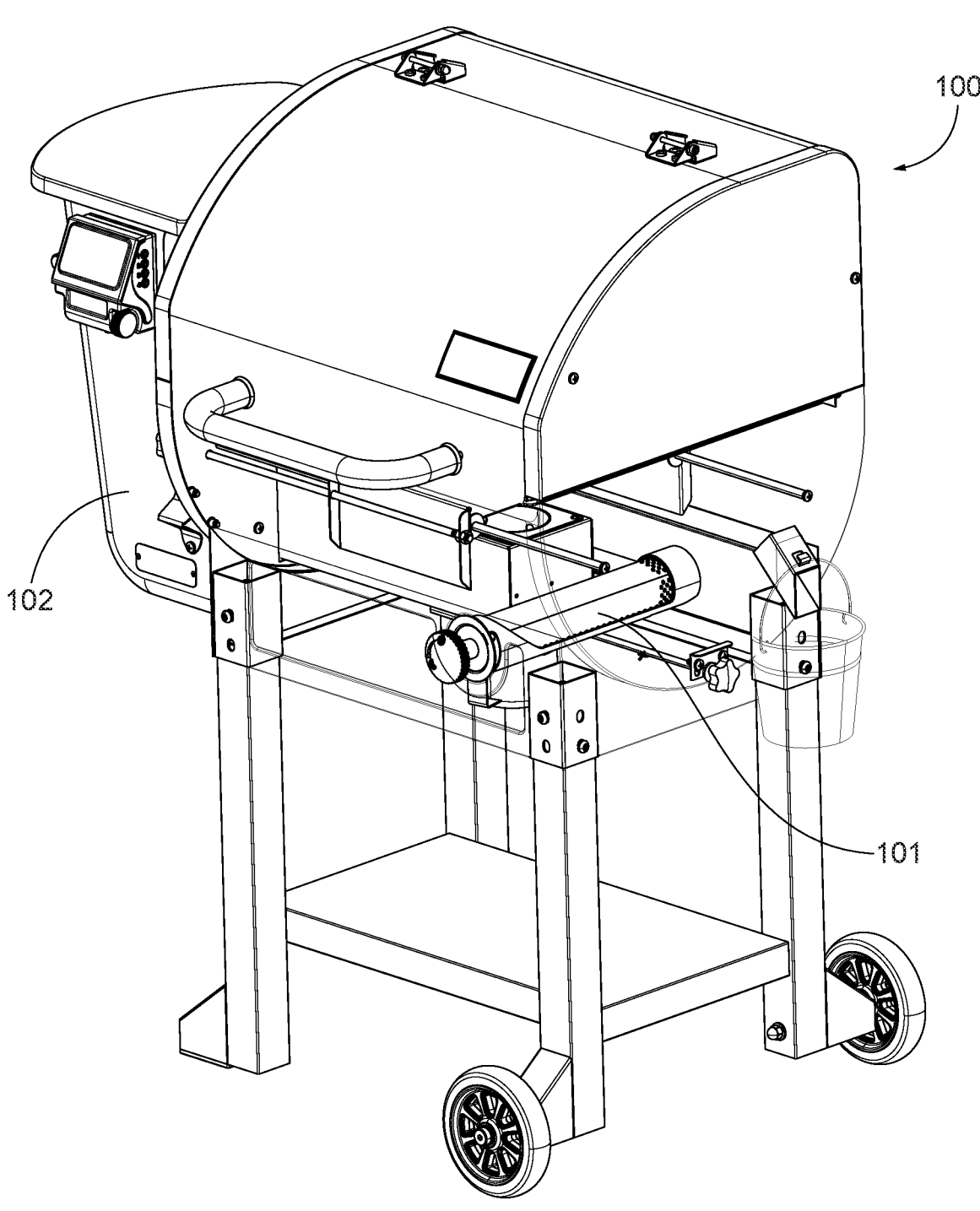

FIG. 3 illustrates a zoomed in view of the integrated pellet tube 101. Additionally, FIG. 4 shows the integrated pellet tube 101 with several grill components made transparent to illustrate the entire integrated pellet tube 101.

Figure 5:
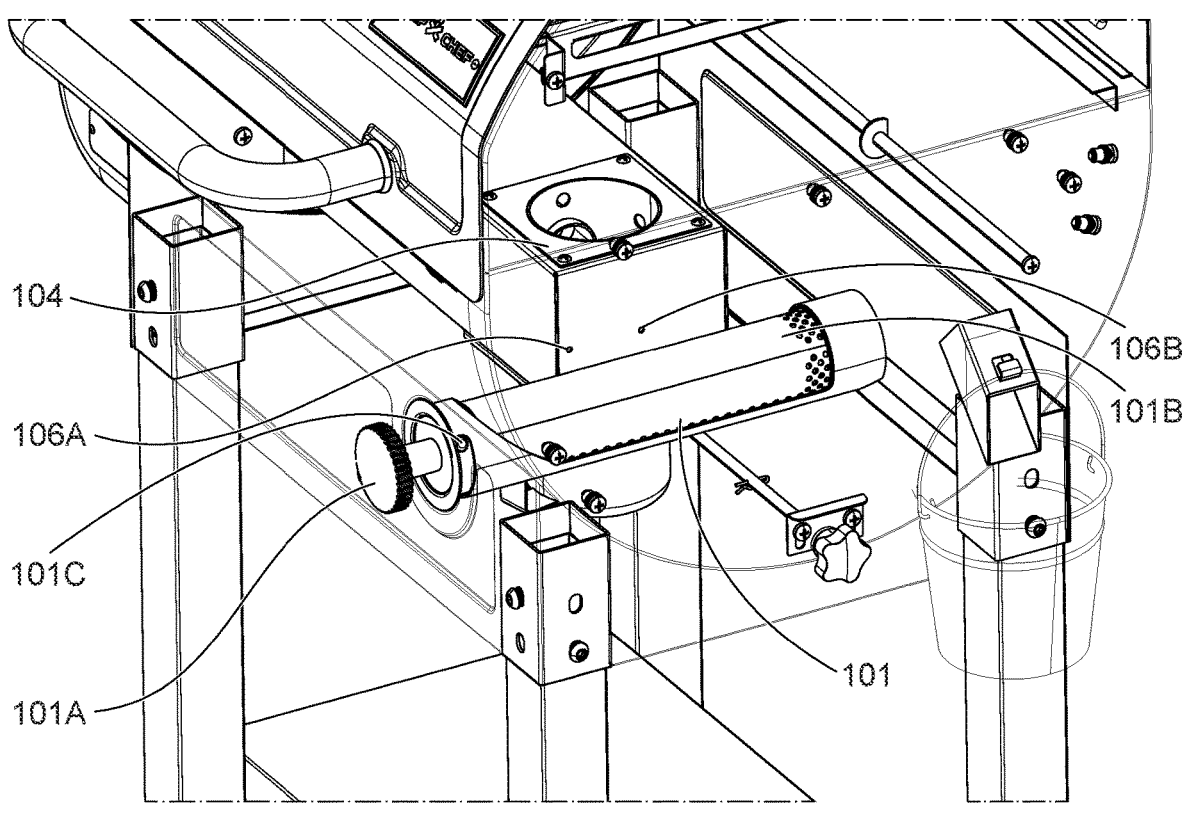
FIGS. 5-8 illustrate additional components of the cooking device with secondary smoke generation according to an exemplary embodiment.
Figure 6:
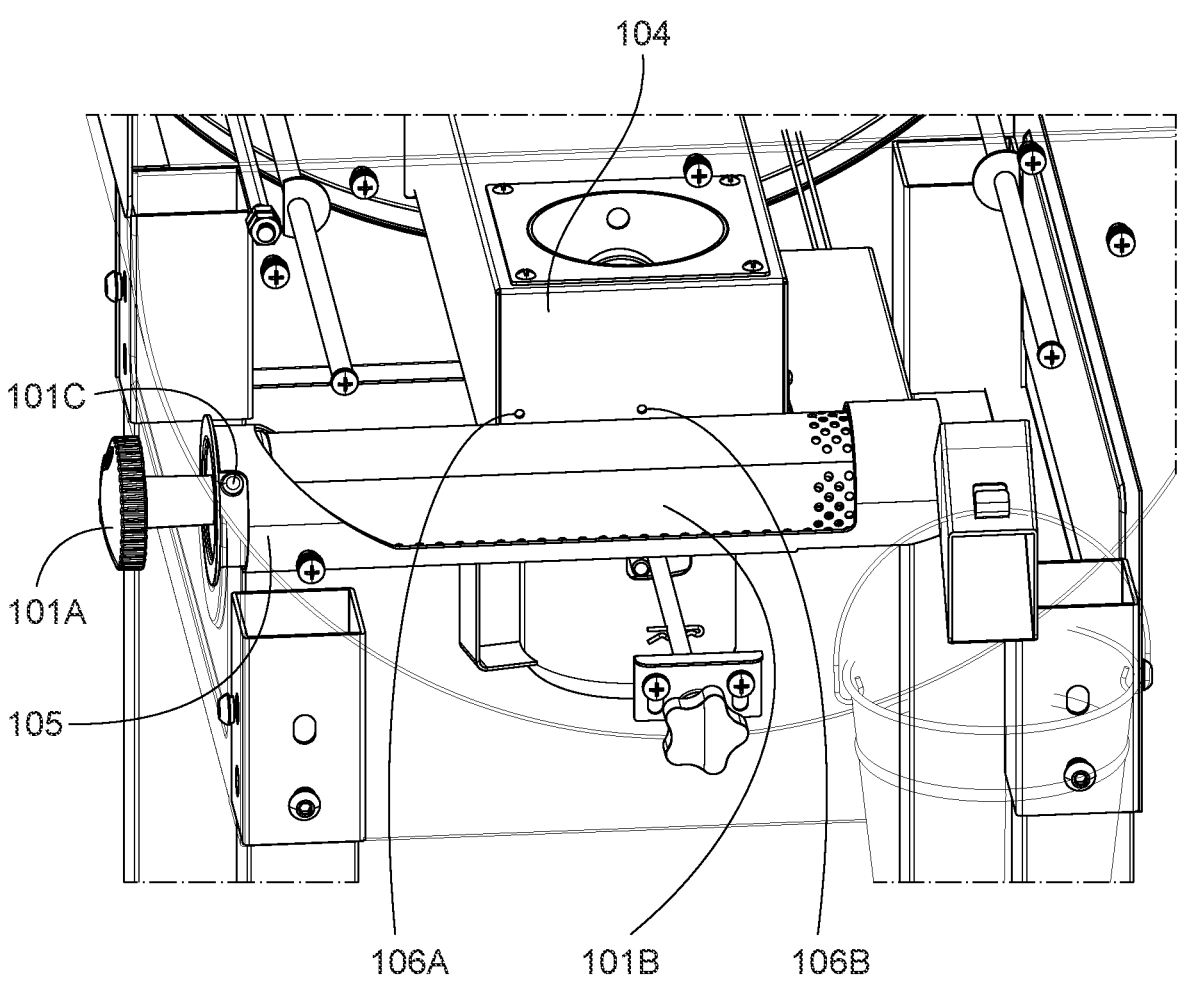
Figure 7:
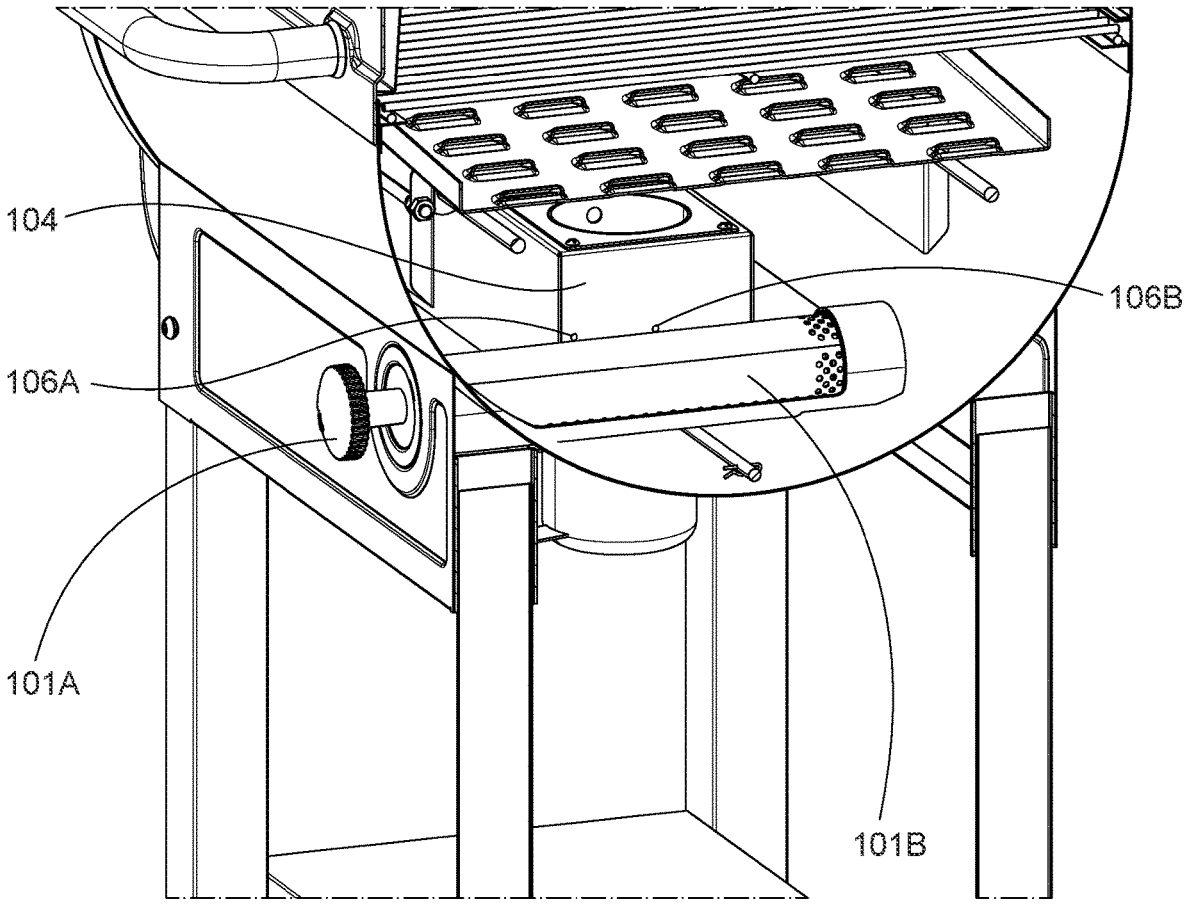
Figure 8:
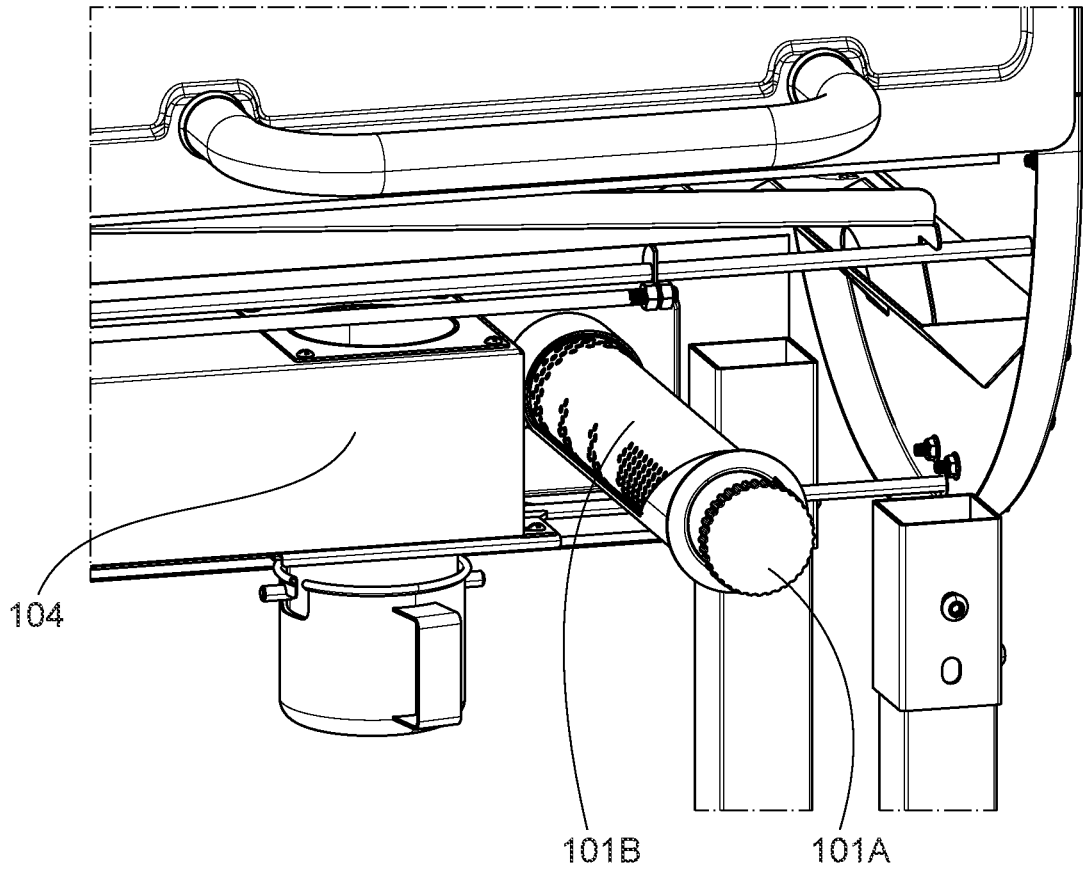

FIGS. 5-8 illustrate additional components of the cooking device with secondary smoke generation according to an exemplary embodiment. Integrated pellet tube 101 includes the tube knob 101A and the pellet tube portion 101B. The tube knob 101A can be constructed from, for example, bakelite (i.e., polyoxybenzylmethylenglycolanhydride) to prevent melting. The tube knob 101A can also have a brass insert molded into it. As shown in FIGS. 5-6, there is also a gap between the end of the pellet tube portion 101B and the tube knob 101A, which prevents the tube knob 101A from getting too hot.

FIGS. 5-6 also illustrate a burner housing 104 for a solid fuel combustion unit (i.e. pellet combustion unit). Burner housing 106 can include openings 106A and 106B to blow air onto the pellet tube 101. The openings 106A and 106B route air to the pellet tube 101 (from the combustion unit) and can keep pellets within the tube smoldering when either the main pellet grill is not running or set at lower temperatures. This extra air keeps pellets from completely extinguishing.

As shown in FIGS. 5-6, the pellet tube portion 101B includes a dimple 101C that protrudes through an opening in a sleeve 105 that receives the integrated pellet tube 101. As explained in greater detail with respect to subsequent drawings, the dimple 101C allows the integrated pellet tube 101 to be aligned in the correct position when it is inserted into sleeve 105. The dimple also acts as a stop on the rotation of the integrated pellet tube 101 that prevents the user from rotating the pellet tube 101 beyond a certain point. The rotation of the pellet tube 101 alters the alignment of the holes in the pellet tube portion 101B and thereby adjusts the burn/smoldering rate of the pellets in the pellet tube.

Figure 9:
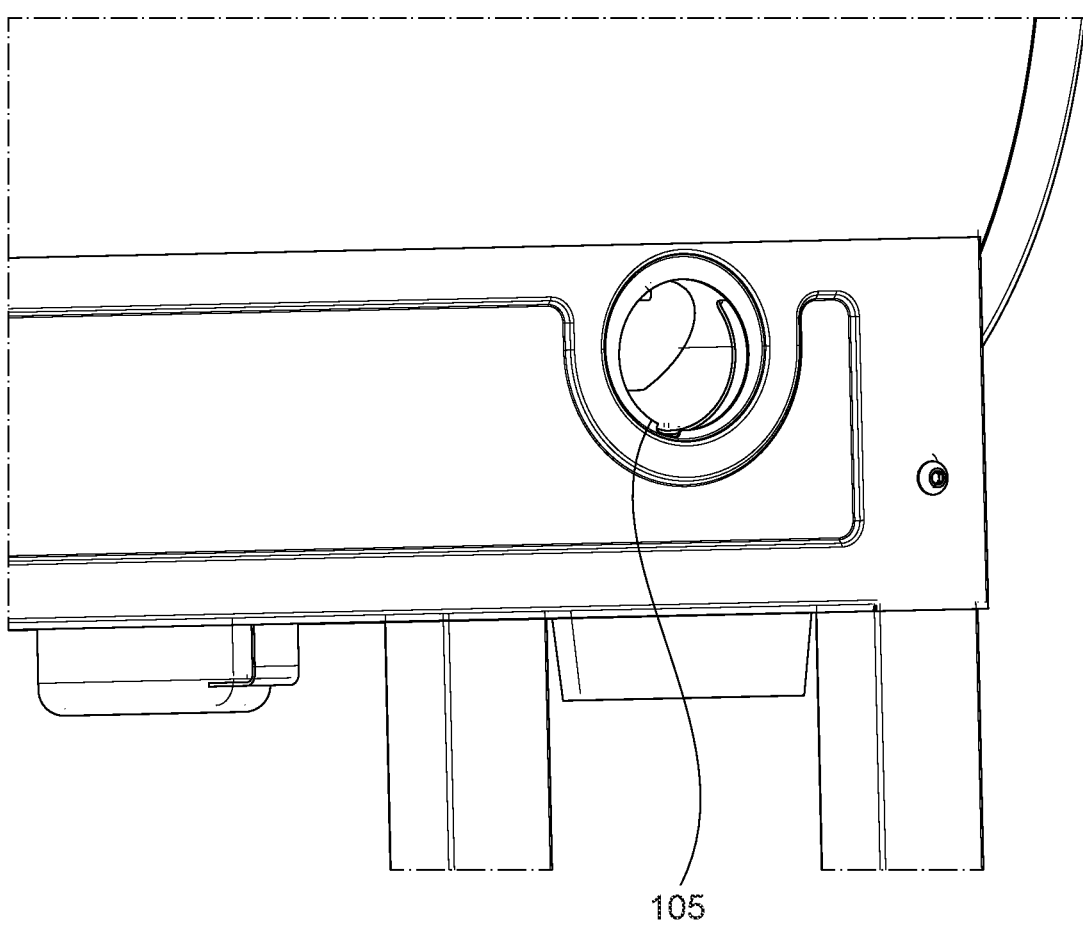
FIG. 9 illustrates a view of the sleeve from the front face of the cooking device according to an exemplary embodiment.
Figure 10:
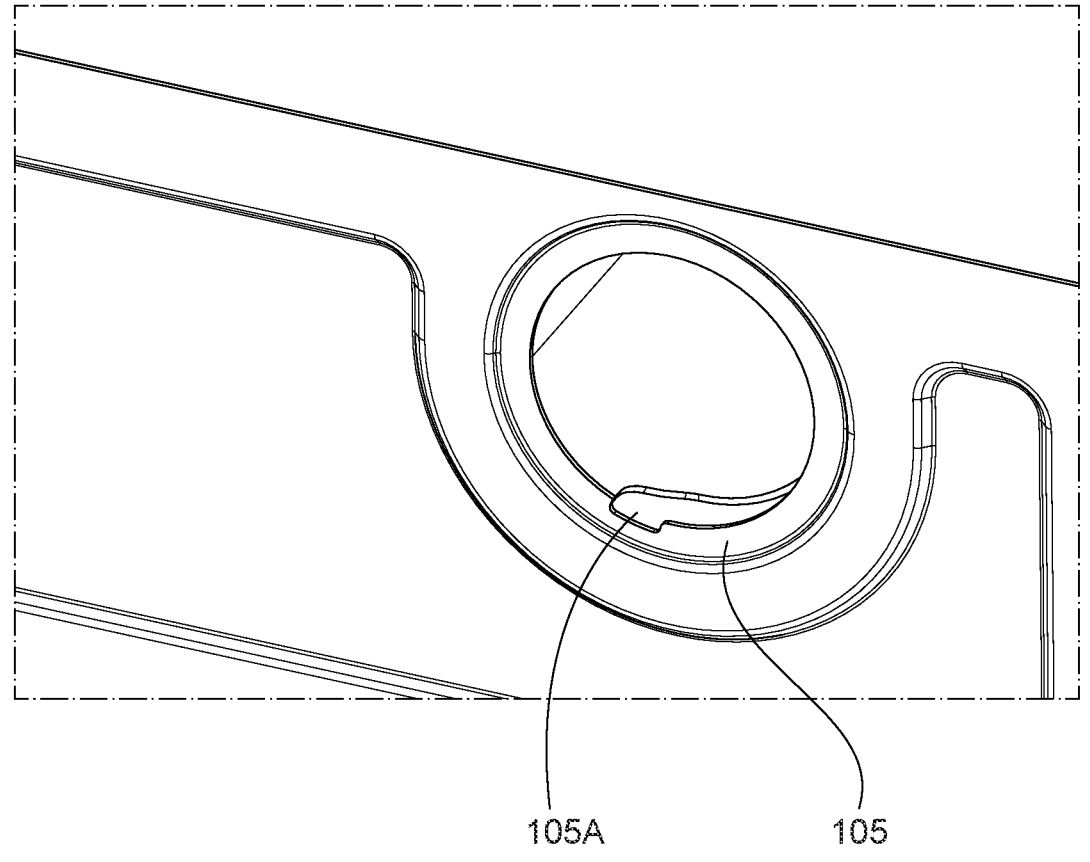
FIGS. 10-12 illustrate the sleeve and the opening in the sleeve through which a dimple is inserted.
Figure 11:
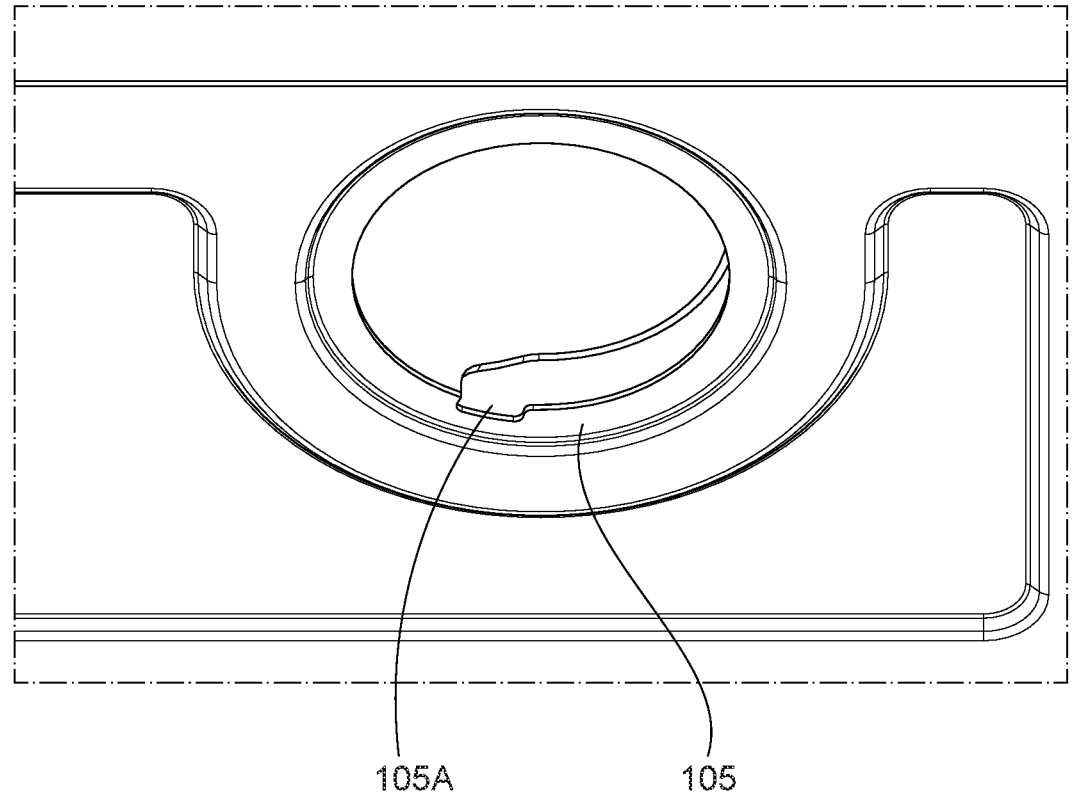
Figure 12:
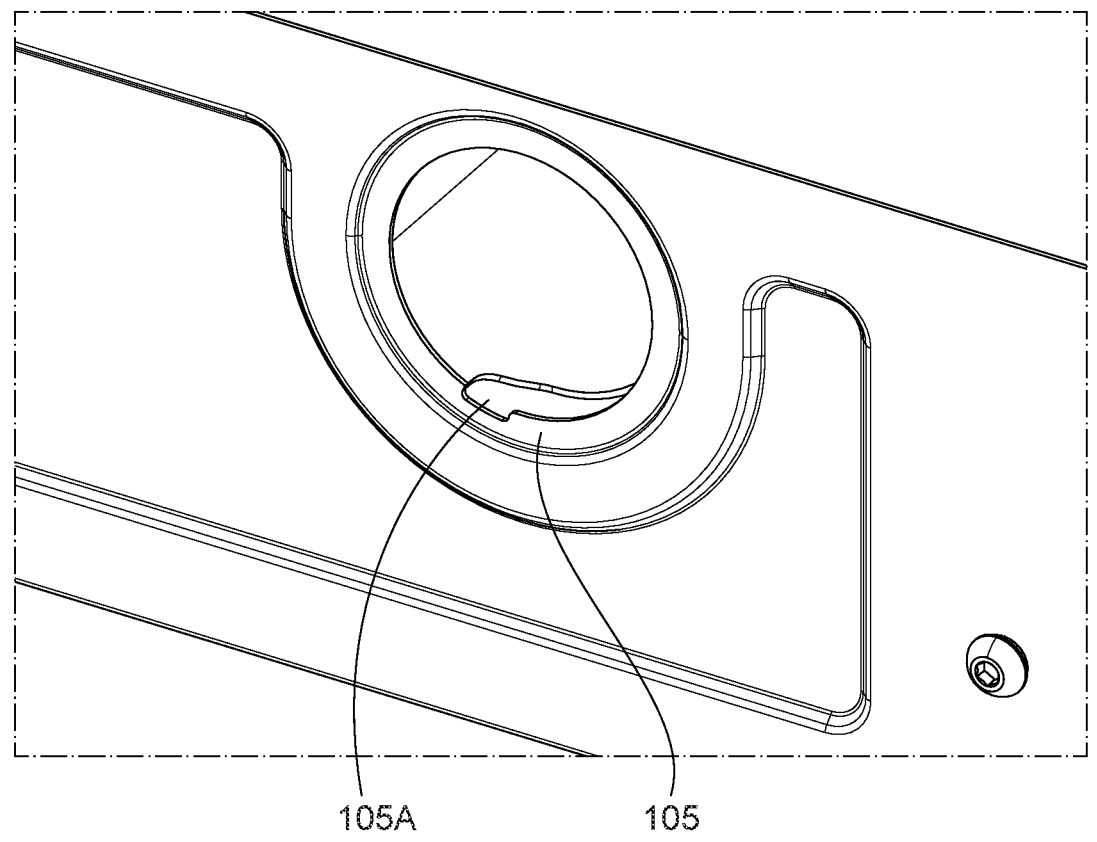
Figure 13:
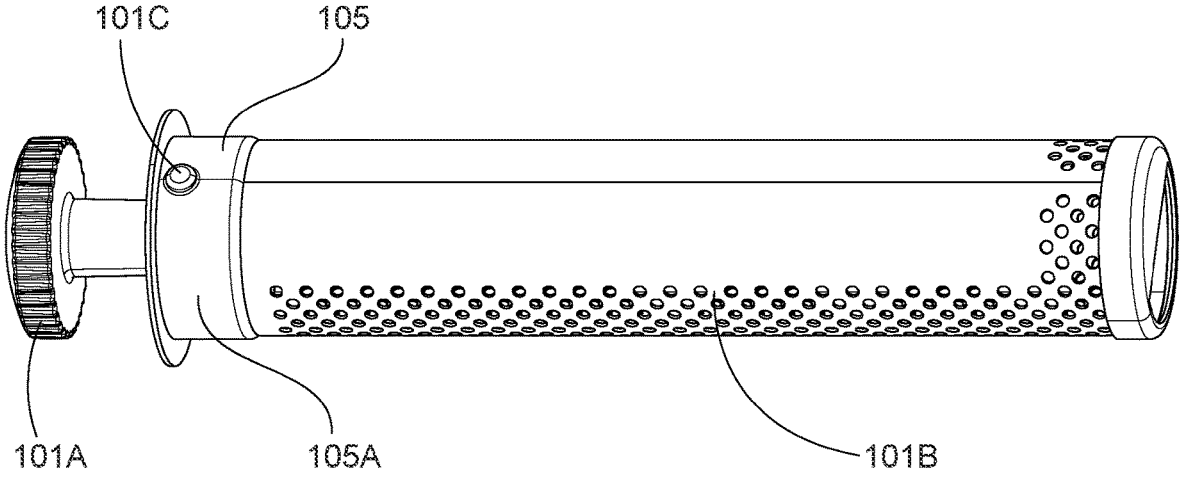
FIGS. 13-15 illustrate additional views of an integrated smoke tube portion, a knob, the sleeve, a sleeve opening, and a dimple.
Figure 14:
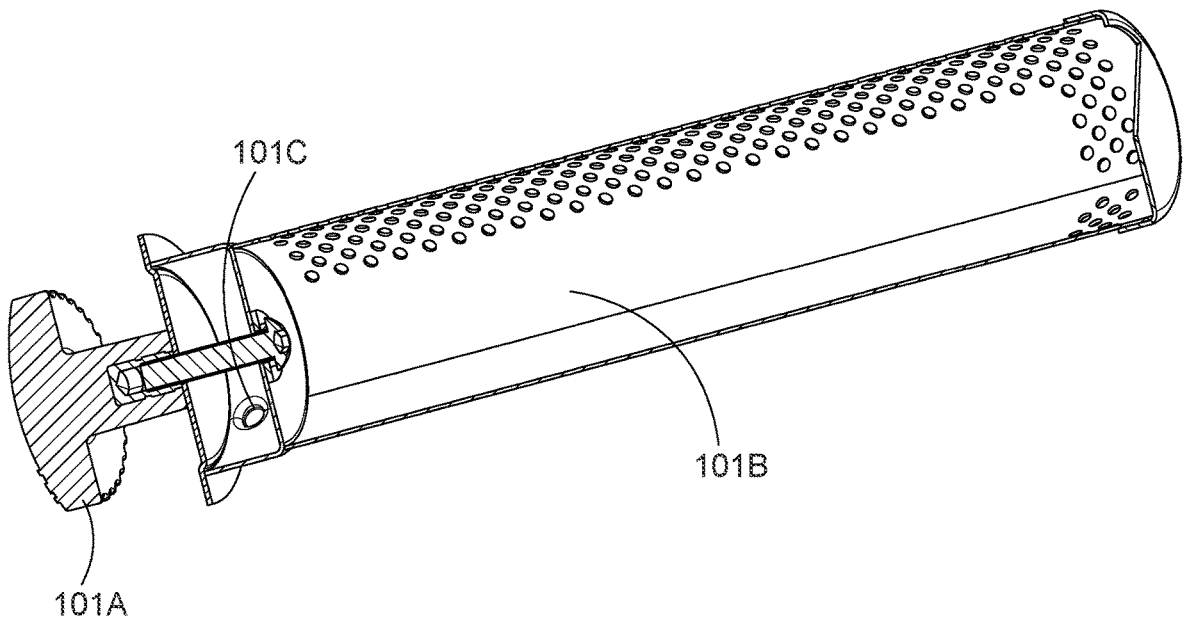
Figure 15:
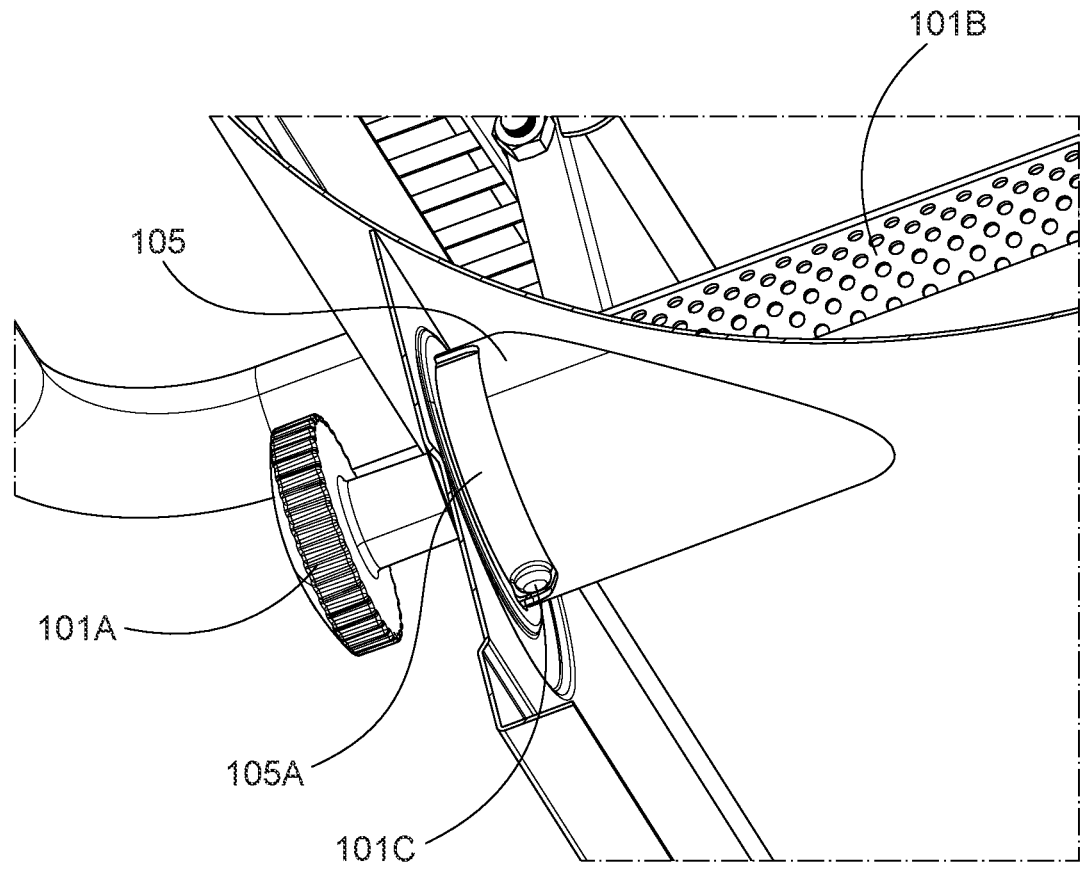

FIG. 9 illustrates a view of the sleeve 105 from the front face of the pellet grill. FIGS. 10-12 illustrate the sleeve 105 and the opening 105A in the sleeve through which the dimple is inserted. As shown in FIGS. 10-12, the opening 105A includes a slot to receive dimple and then curves to allow the integrated pellet tube to be rotated and the dimple to move through the opening 105A region. FIGS. 13-15 illustrate additional views of the integrated smoke tube portion 101B, the knob 101A, the sleeve 105, the sleeve opening 105A, and the dimple 101C.

Figure 16:
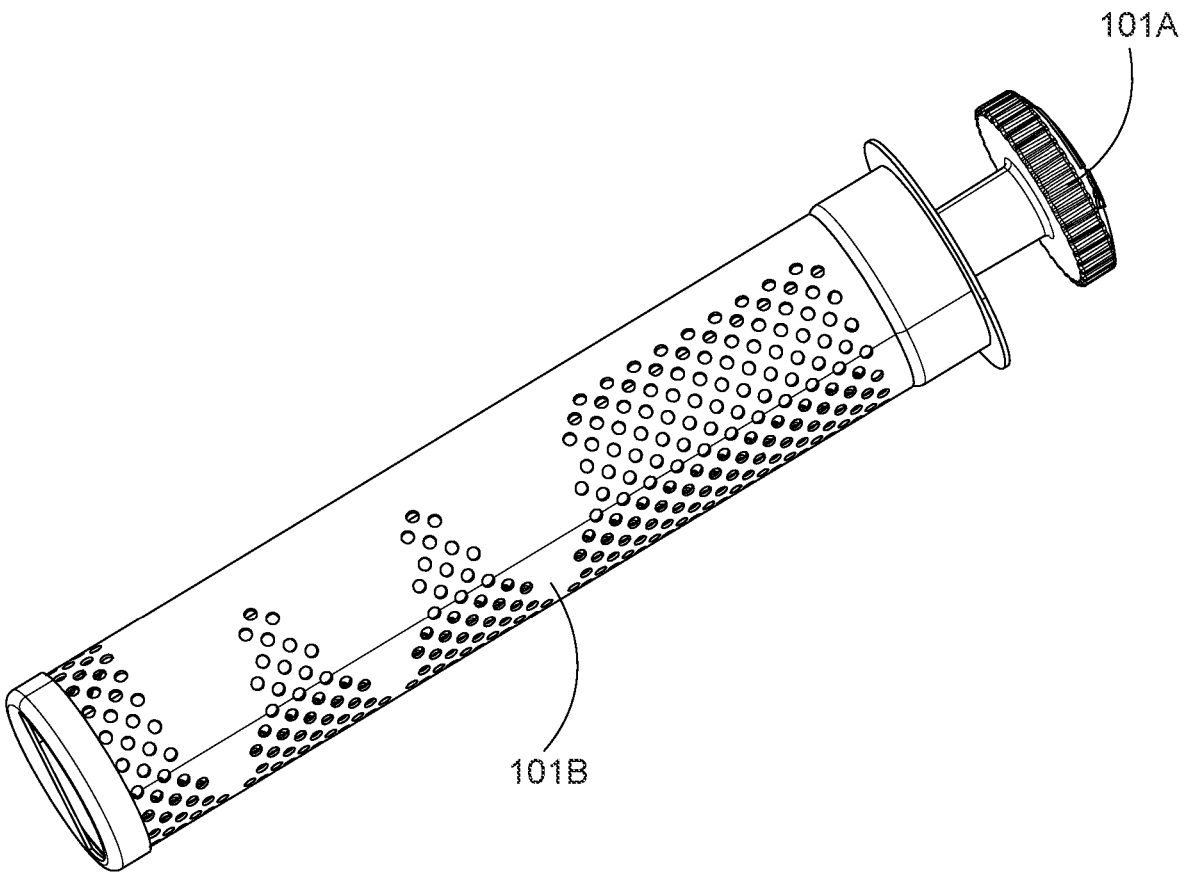
FIGS. 16-17 show additional views of an integrated smoke tube portion illustrating a ventilation hole pattern.
Figure 17:
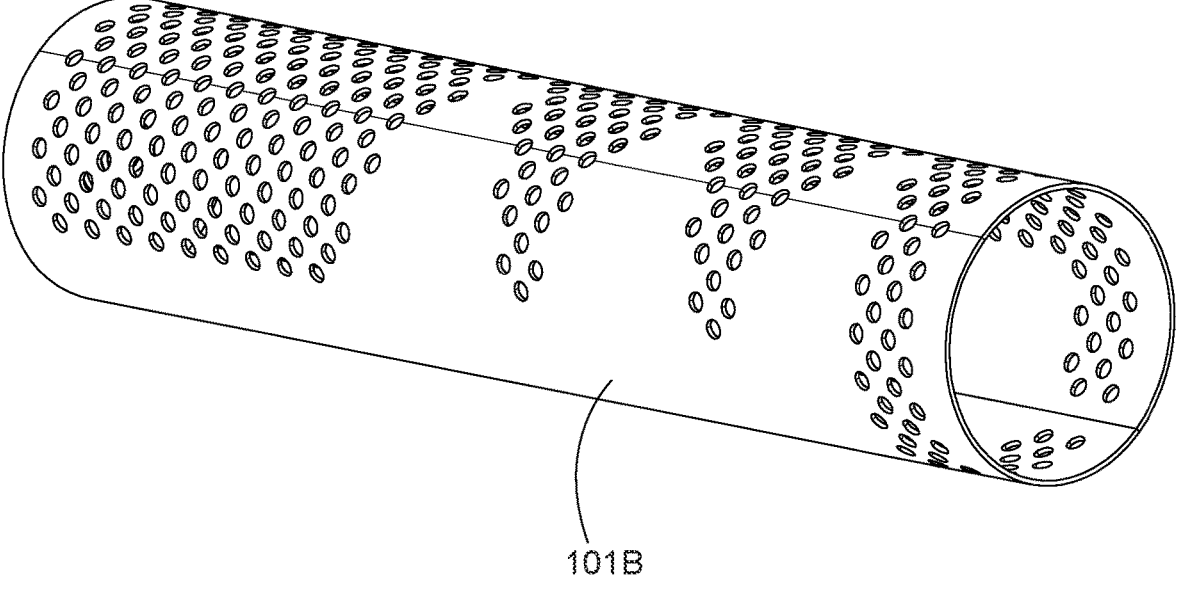
Figure 18:
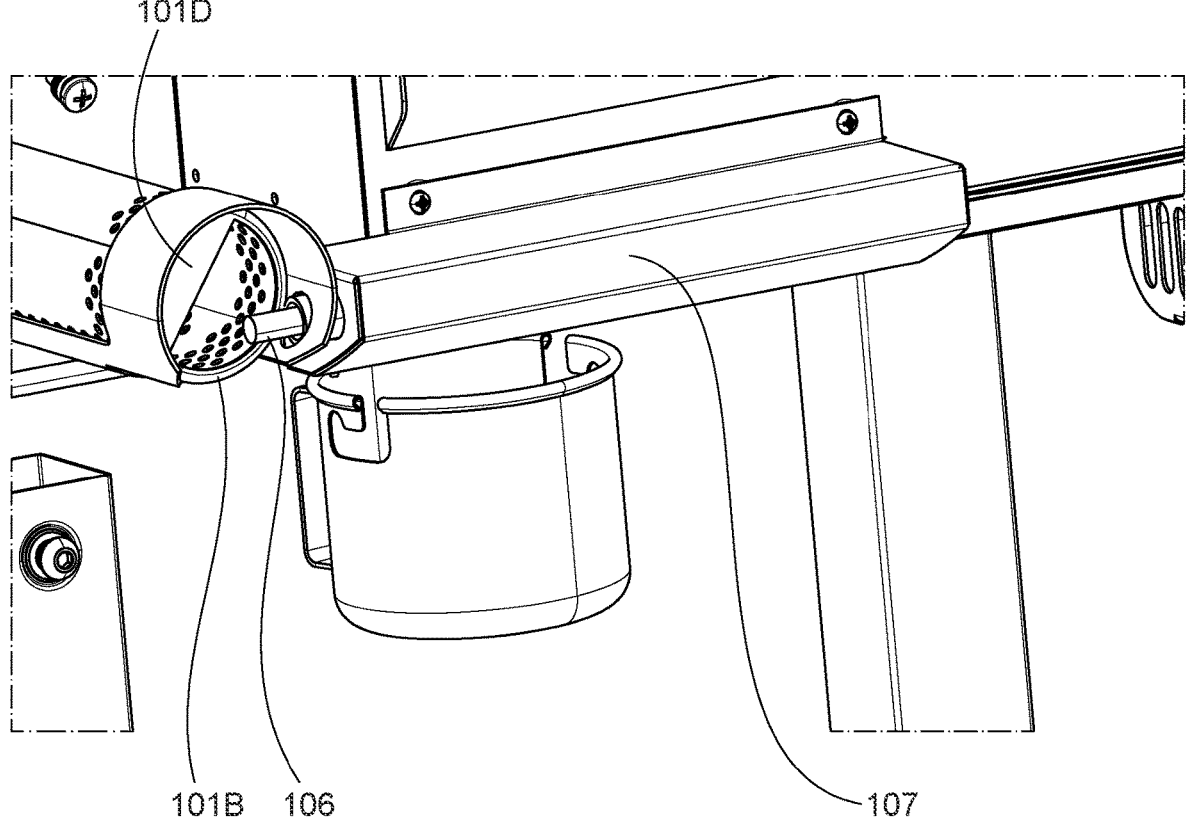
FIGS. 18-23 illustrate the back end of an integrated pellet tube and surrounding structures according to an exemplary embodiment.
Figure 19:
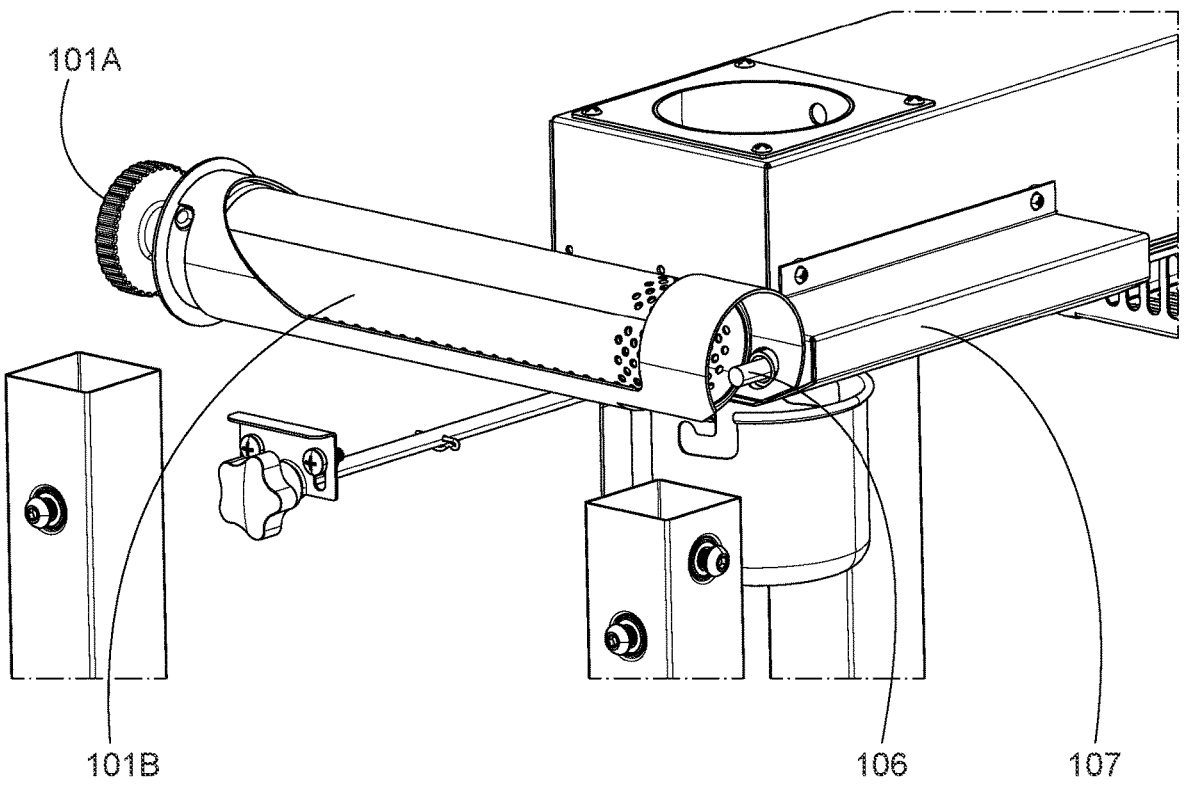
Figure 20:
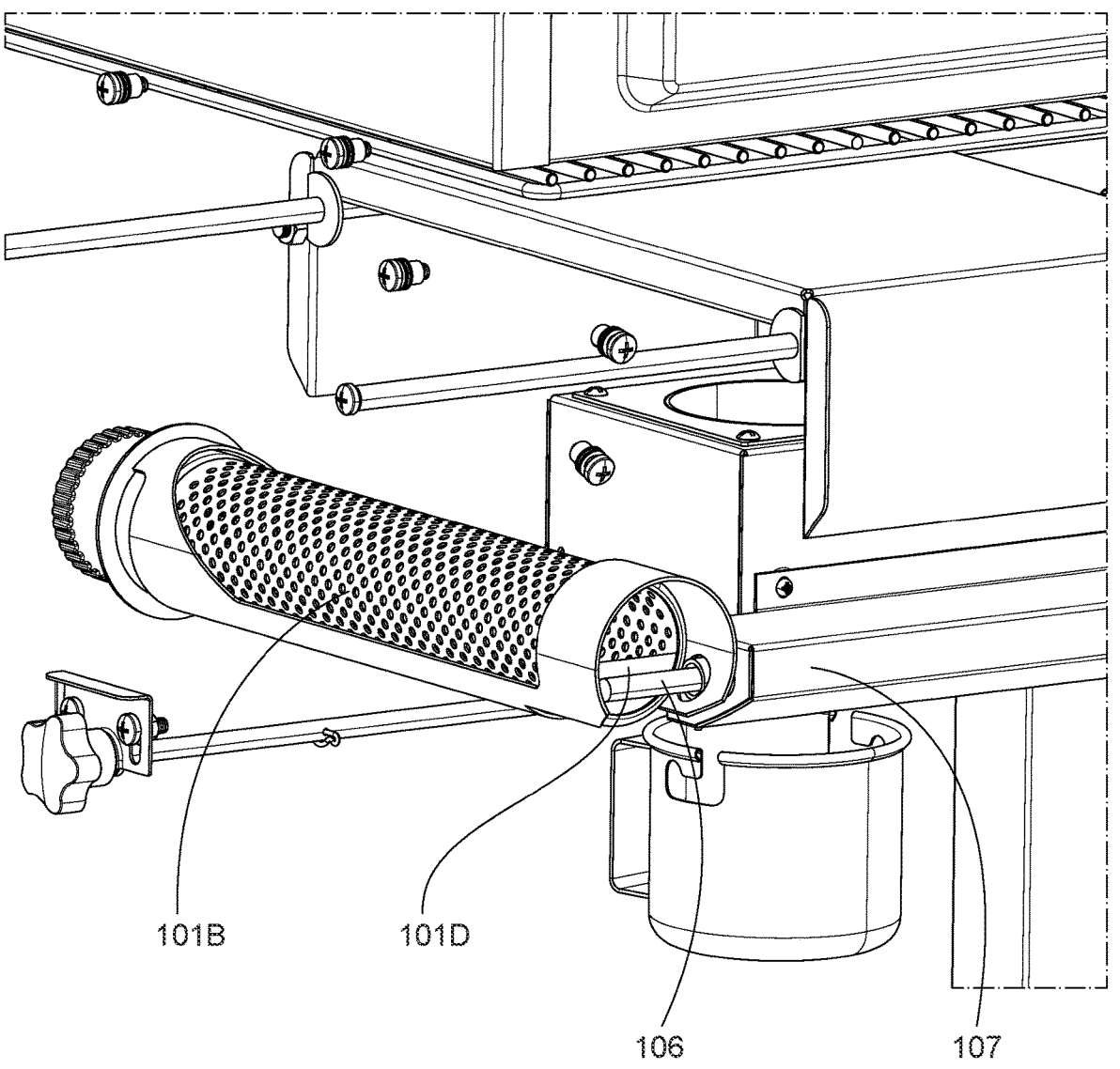

FIGS. 16-17 show additional views of the integrated smoke tube portion 101B illustrating the ventilation hole pattern. The hole pattern allows more air to flow into and out of the tube and also allows for greater user control of the burn rate of pellets within the tube by adjusting the position of the tube (by rotating the tube) relative to the sleeve. The hole pattern shown ensures that less air will enter and exit the tube when the tube is in the closed/low position. Therefore, even when the pellet grill is set to high temperatures, the pellets within the tube can be set to smolder rather than burn. As the tube is rotated more holes open up and more air is blown on the pellets, causing them to burn and/or burn faster.

The integrated smoke tube portion 101B and end cap (in black) can be constructed from 304 stainless steel (also known as A2 Stainless or 18/8 for its composition of 18% chromium and 8% nickel). The black end cap of integrated smoke tube portion 101B is steel and can be powder coated black and assembled with the knob 101A.

Figure 21:
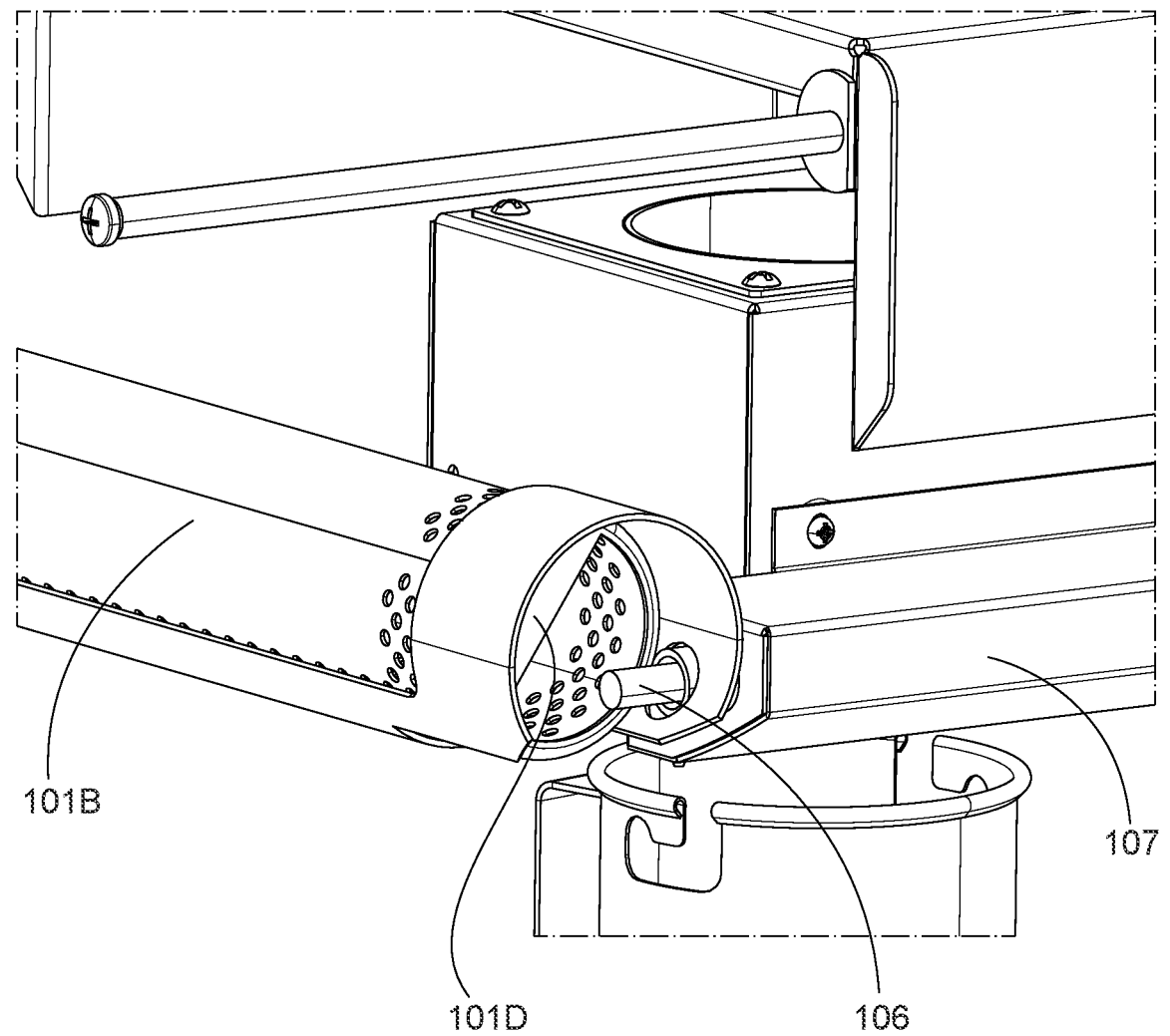

FIGS. 18-23 illustrate the back end of the integrated pellet tube 101 and surrounding structures according to an exemplary embodiment. As shown, the integrated pellet tube portion 101B includes a barrier cap 101D on the back end that is configured to keep pellets within the integrated pellet tube 101. Also shown is a hot rod tube 106 that is used to ignite the pellets within the integrated pellet tube 101. The hot rod tube 106 can be the same hot rod tube that is used in the primary burner of the pellet grill. Bracket 107 can be used to run the hot rod to the integrated pellet tube 101. As shown in FIG. 21, when the integrated pellet tube 101 is rotated to the lighting position, the pellets will fall out against the hot rod 106 and light.

Figure 22:
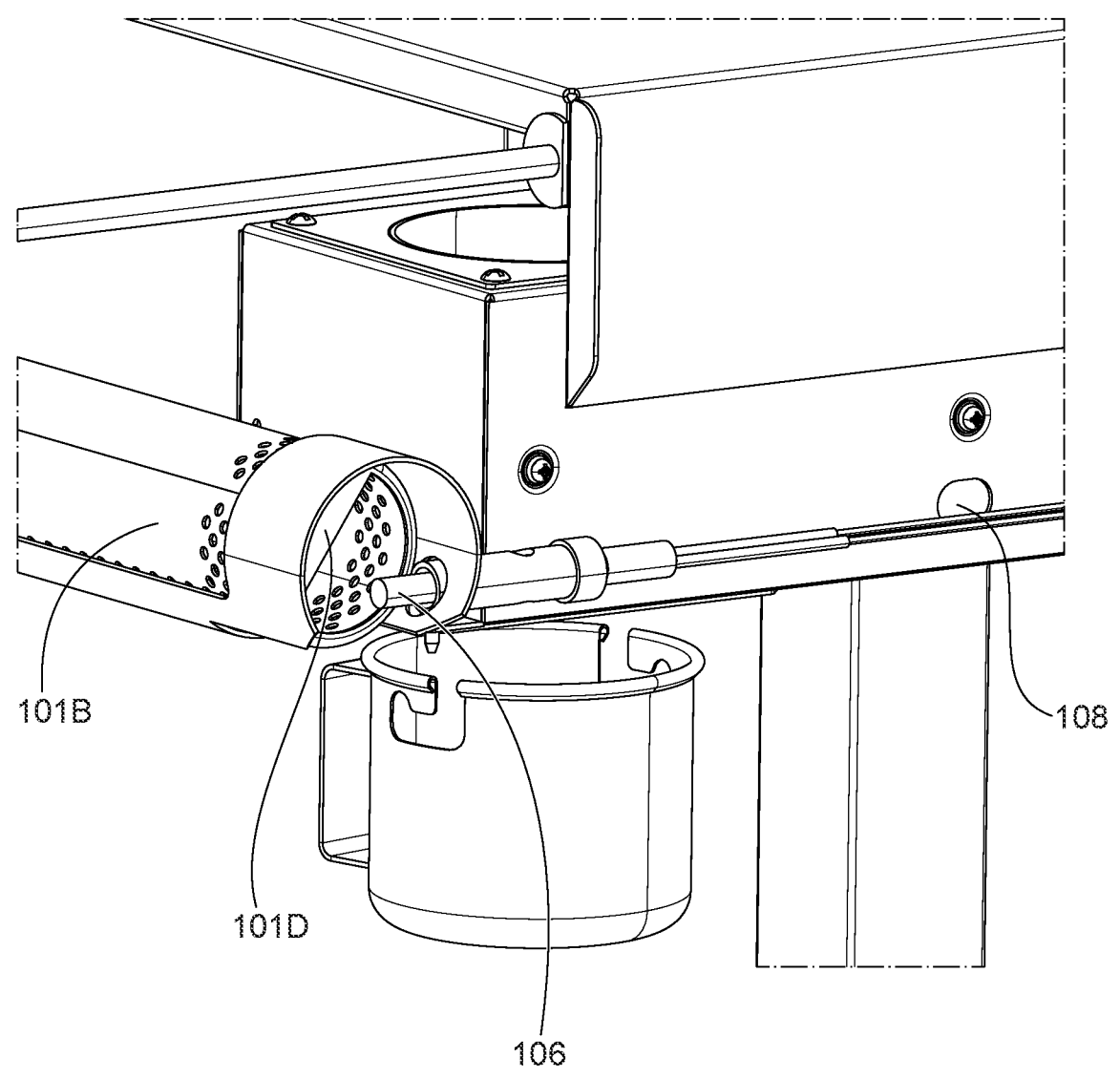
Figure 23:
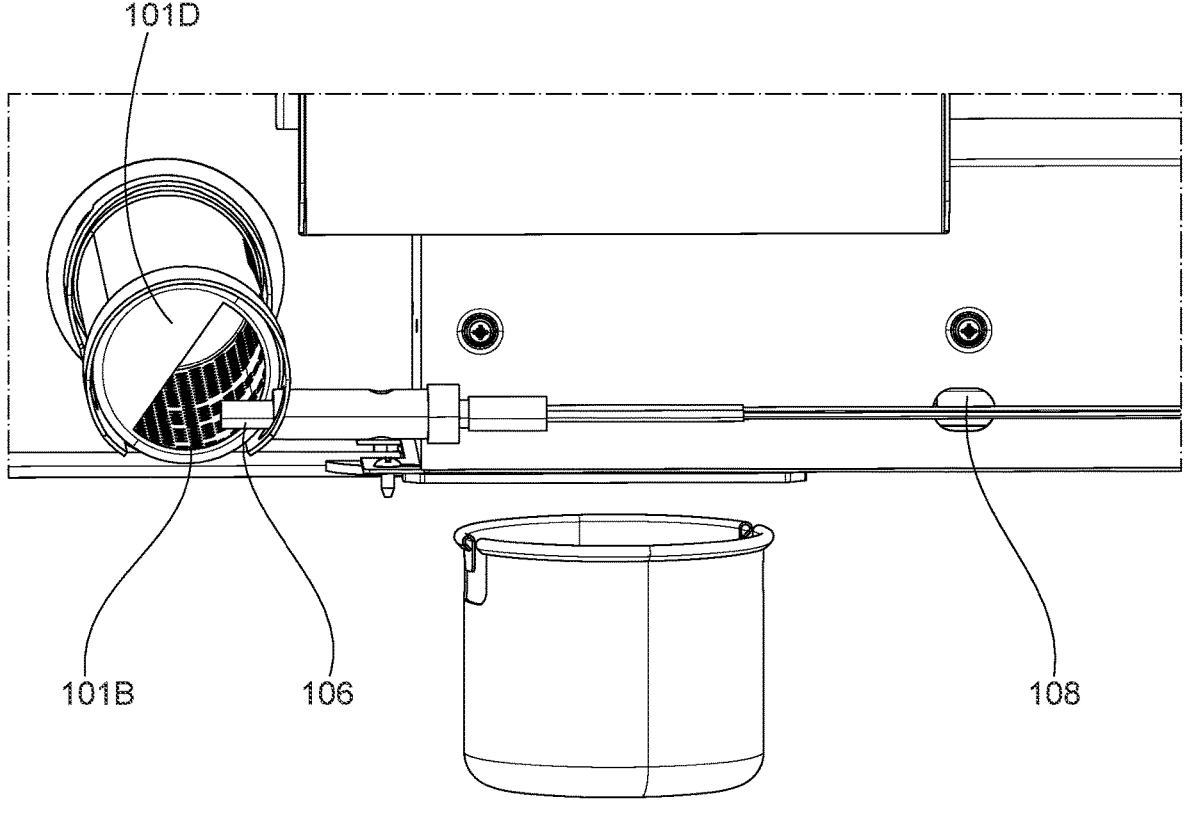

FIGS. 22-23 illustrate the back end of the grill without the bracket 107. As shown in FIGS. 22-23, slot 108 can be used for feeding the hot rod out of the feeder box and into the bracket.

Figure 24:
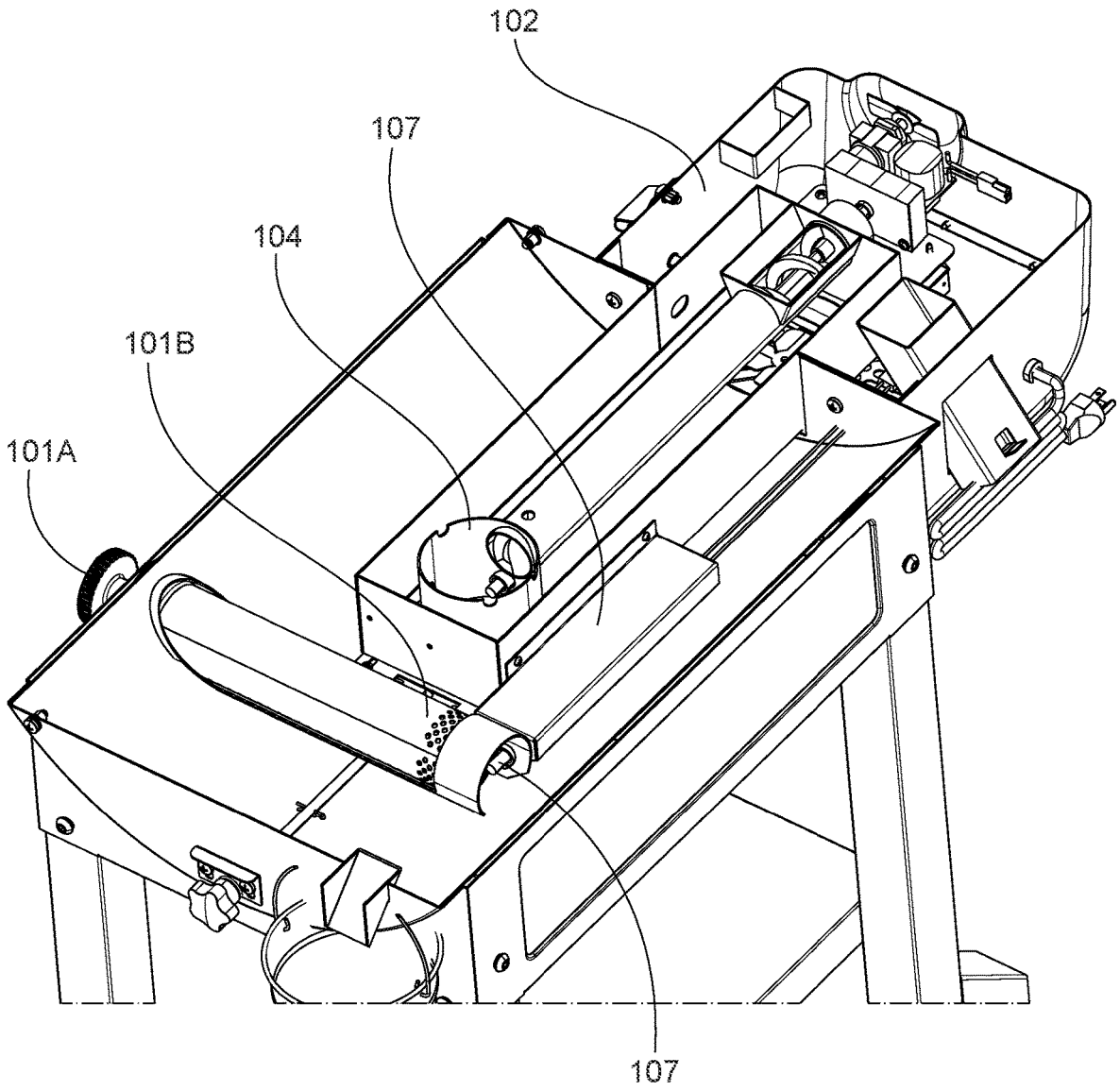
FIG. 24 illustrates internal components of the pellet grill according to an exemplary embodiment.
Figure 25:
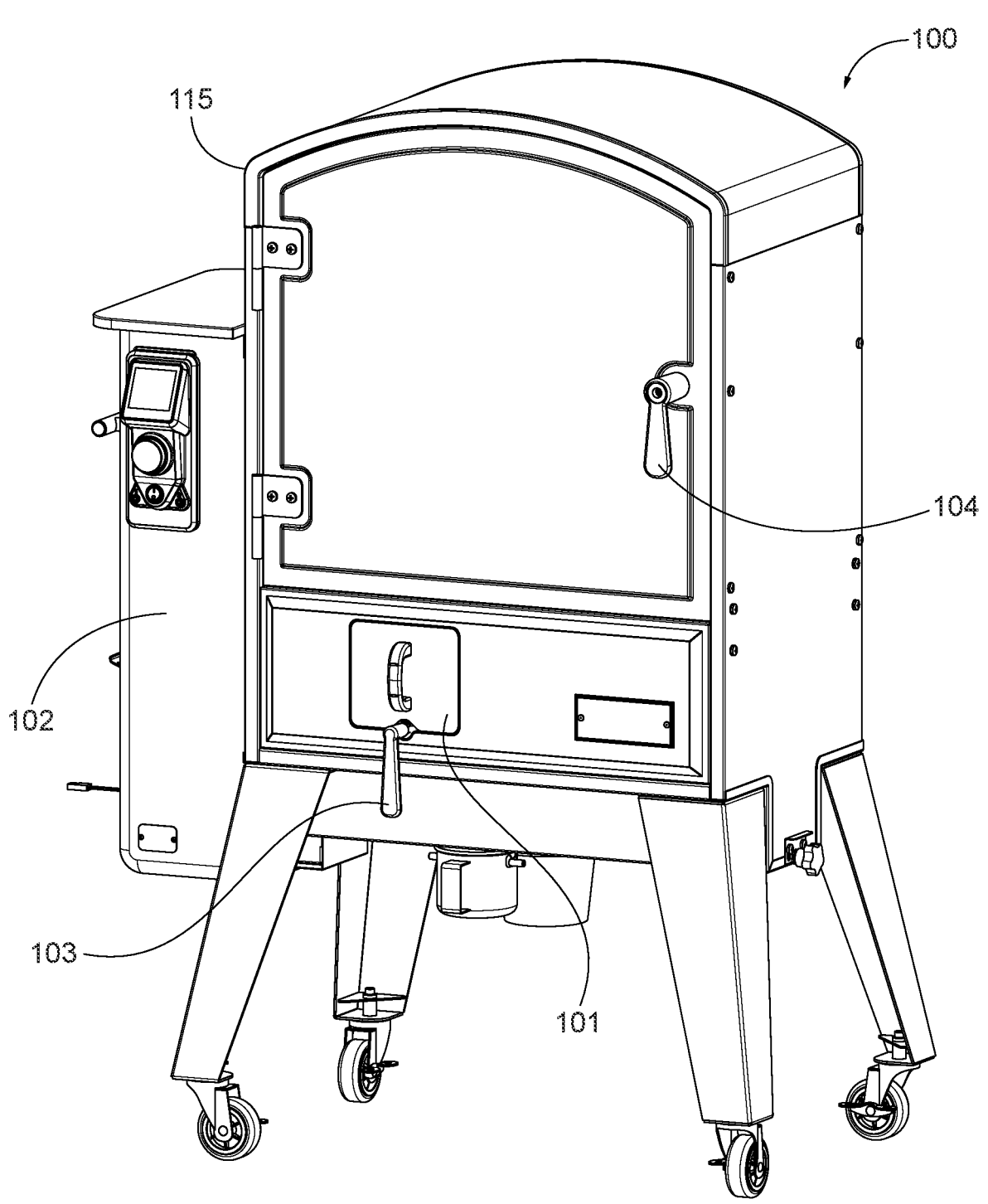
FIGS. 25-29 illustrate another cooking device with secondary smoke generation according to an exemplary embodiment.
Figure 26:
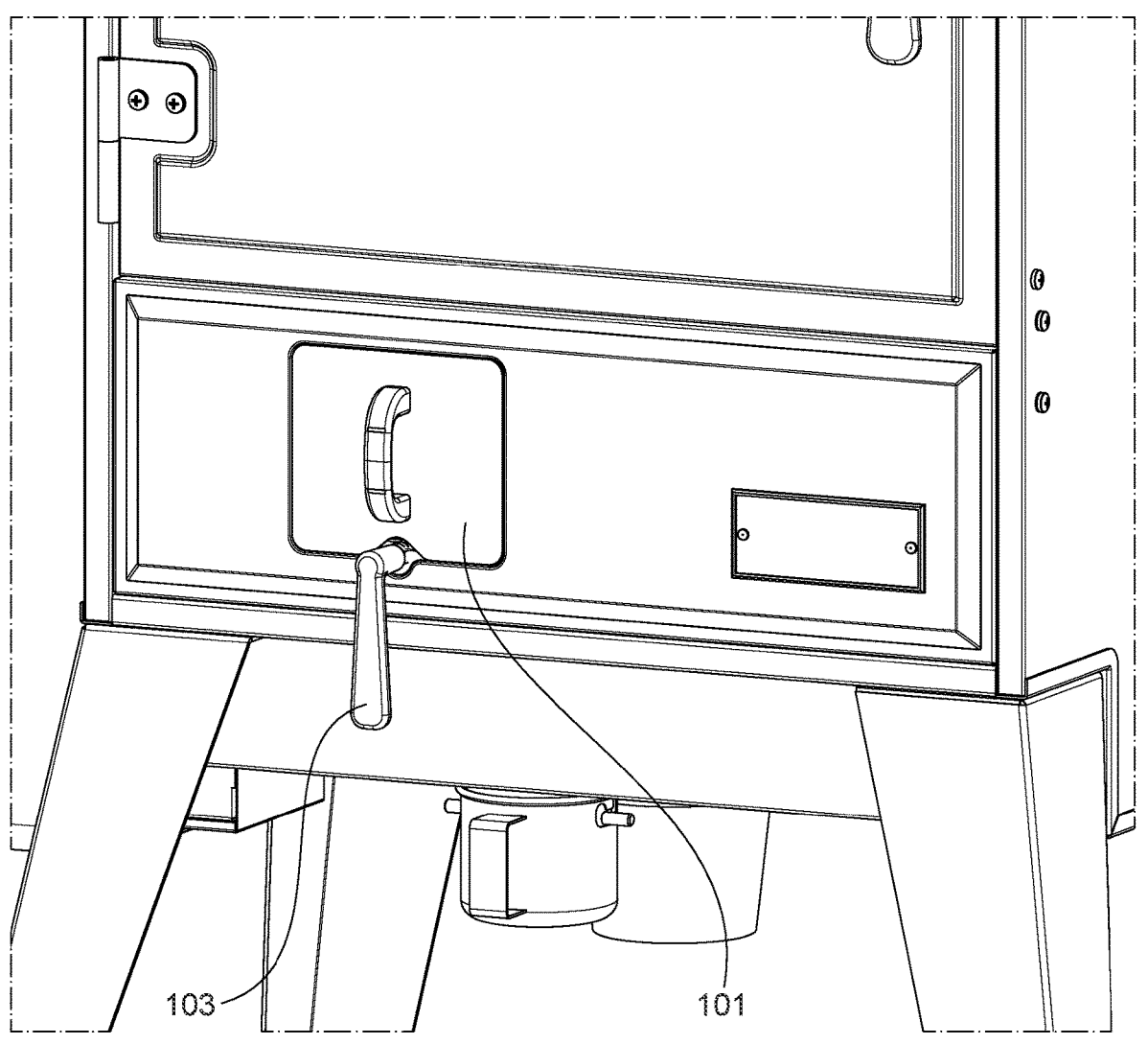
Figure 27:
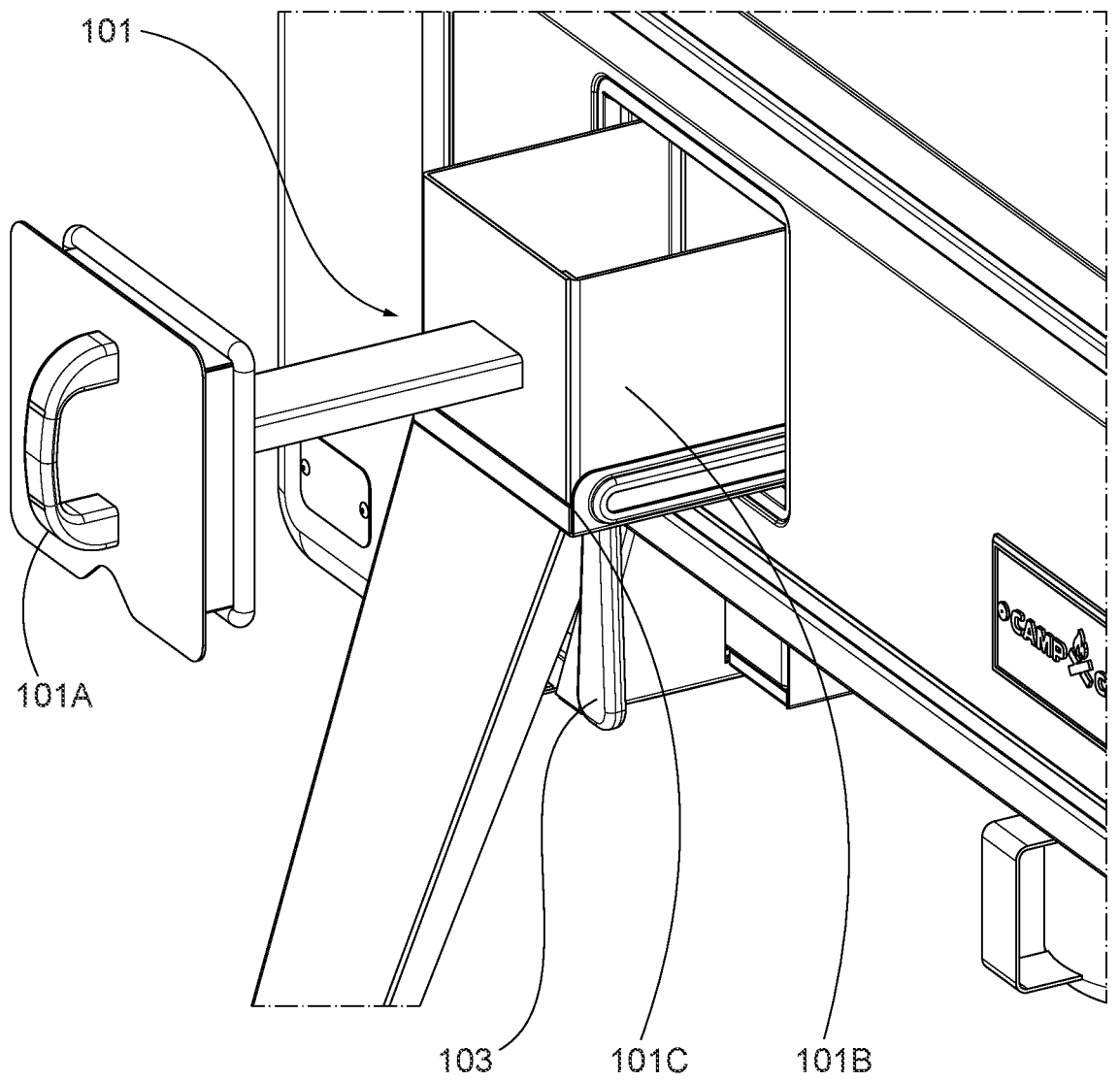

FIG. 24 illustrates internal components of the pellet grill according to an exemplary embodiment. As shown in FIG.

24, the pellet grill includes a pellet hopper 102 storing pellets that provides the pellets to a solid fuel combustion unit 104 that combusts the pellets and the integrated pellet tube portion 101B that acts as a secondary solid fuel combustion unit and also combusts pellets stored in the integrated pellet tube.

FIGS. 25-29 illustrate another cooking device with secondary smoke generation according to an exemplary embodiment. The cooking device shown in these figures is a vertical smoker 200 that includes a pellet hopper 202 which feeds pellets to first solid fuel combustion unit 205 within the smoker 200 via tube 206 and provides a first source of smoke. The smoker 200 additionally includes a secondary solid fuel combustion unit in the form of a removable smoke box 201 that is configured to slide into and out of an opening in the smoker/cooking device. The smoke box 201 is removably inserted into the cooking device below a cooking chamber within the smoker and configured to combust a second solid fuel and provide a second source of smoke.

The integrated stick smoke box 201 allows a user to add charcoal, wood chunks, and/or pellets to the smoker 200 to add additional smoke flavor. When using charcoal or wood chunks, this can add more of a traditional smoke flavor to the pellet smoke generated from the combustion of wood pellets by the primary burner.

The integrated smoke box 201 can be opened slightly to allow more air flow so that the solid fuel (e.g., the charcoal or wood) smokes more. Additionally, handle 203 is used to rotate a disc 204 over the burner 205 to allow the direct flame from the pellet burner 205 to ignite the wood or charcoal in the box. The disc 204 is a butterfly valve that lets heat and air up in the smoke box 201B from the burner cup of the burner 205 to start the solid fuel within the smoke box 201B smoking. Of course, different types of open/closed valves can be utilized. The handle 203 is typically opened to ignite and then closed. The handle 201A of the integrated smoke box 201 has a gasket attached to seal the chamber so that smoke will go up into the chamber. There is also a gap 201D between the gasket and the handle 201A that improves the air flow of the smoke box.

Figure 28:
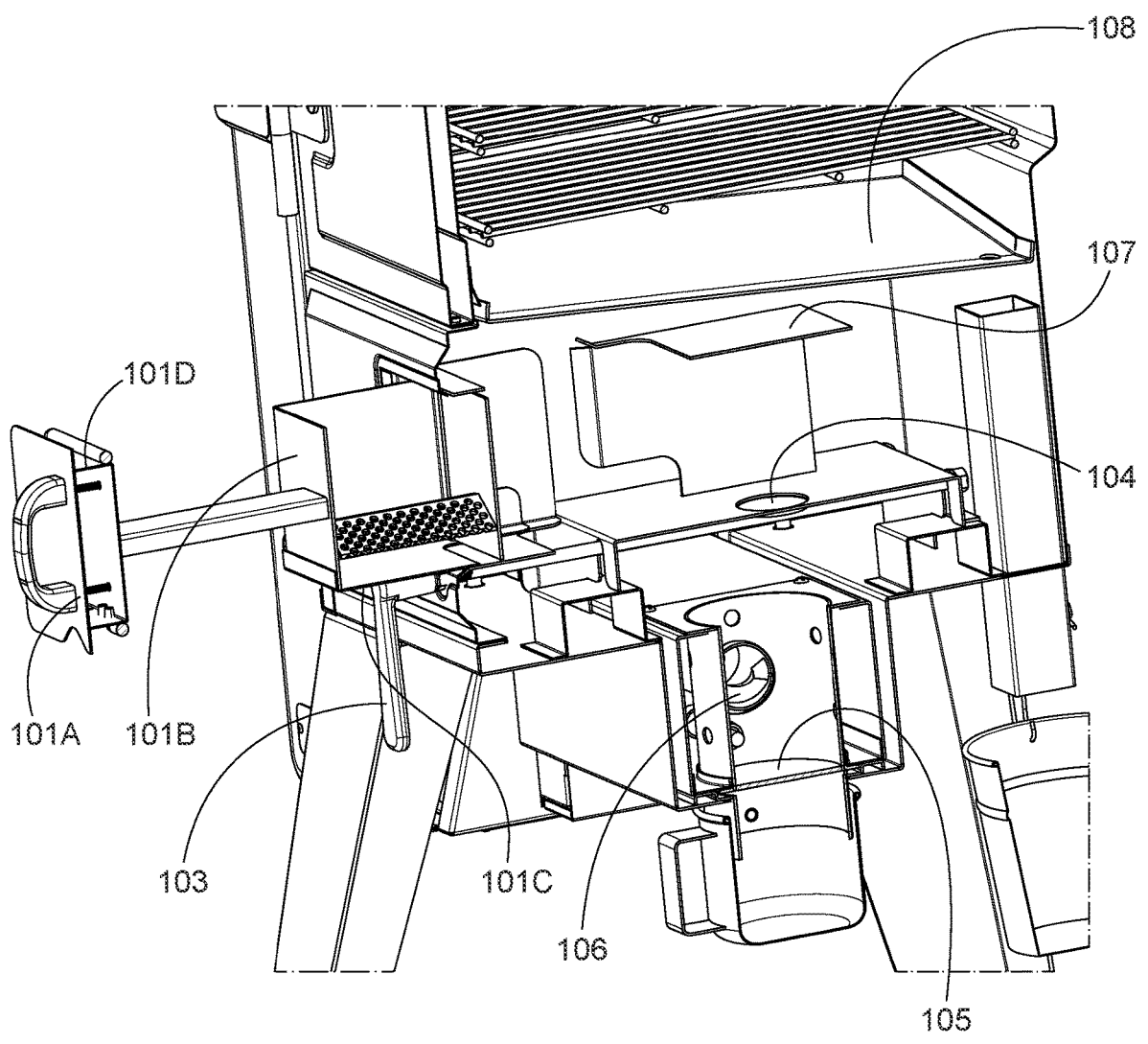
Figure 29:
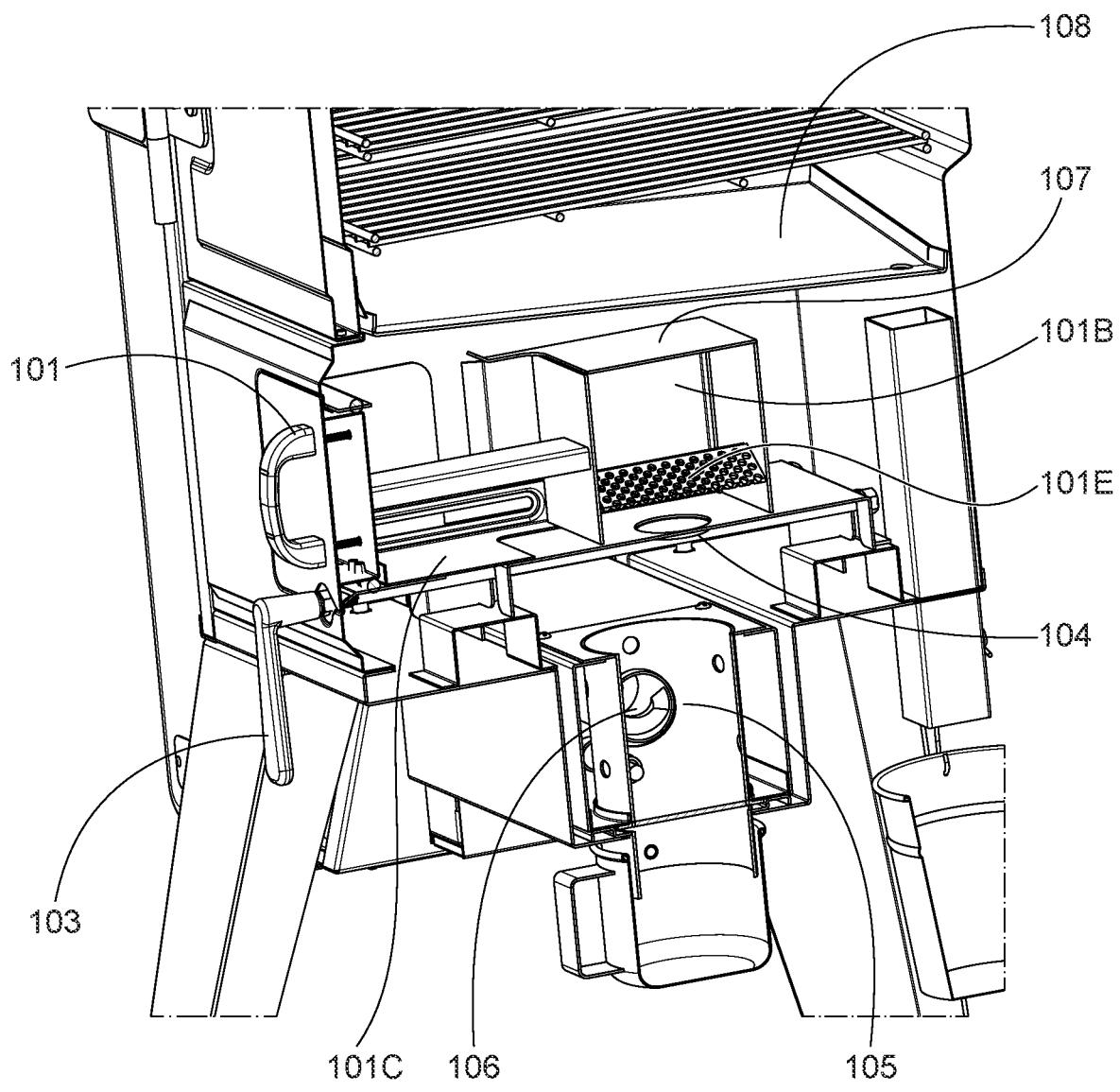
Figure 30:
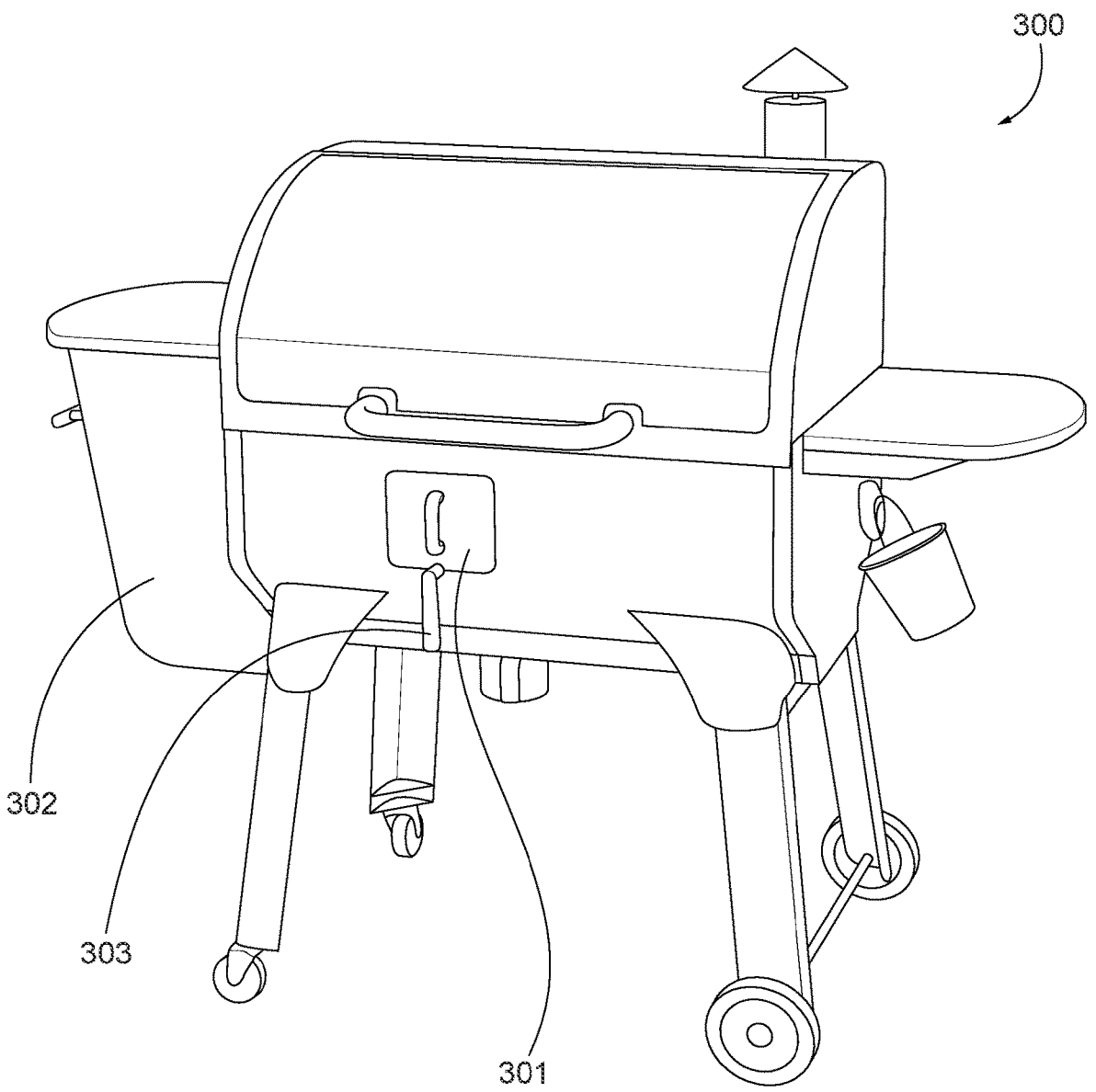
FIGS. 30-37 illustrate another cooking device with secondary smoke generation according to an exemplary embodiment.
Figure 31:
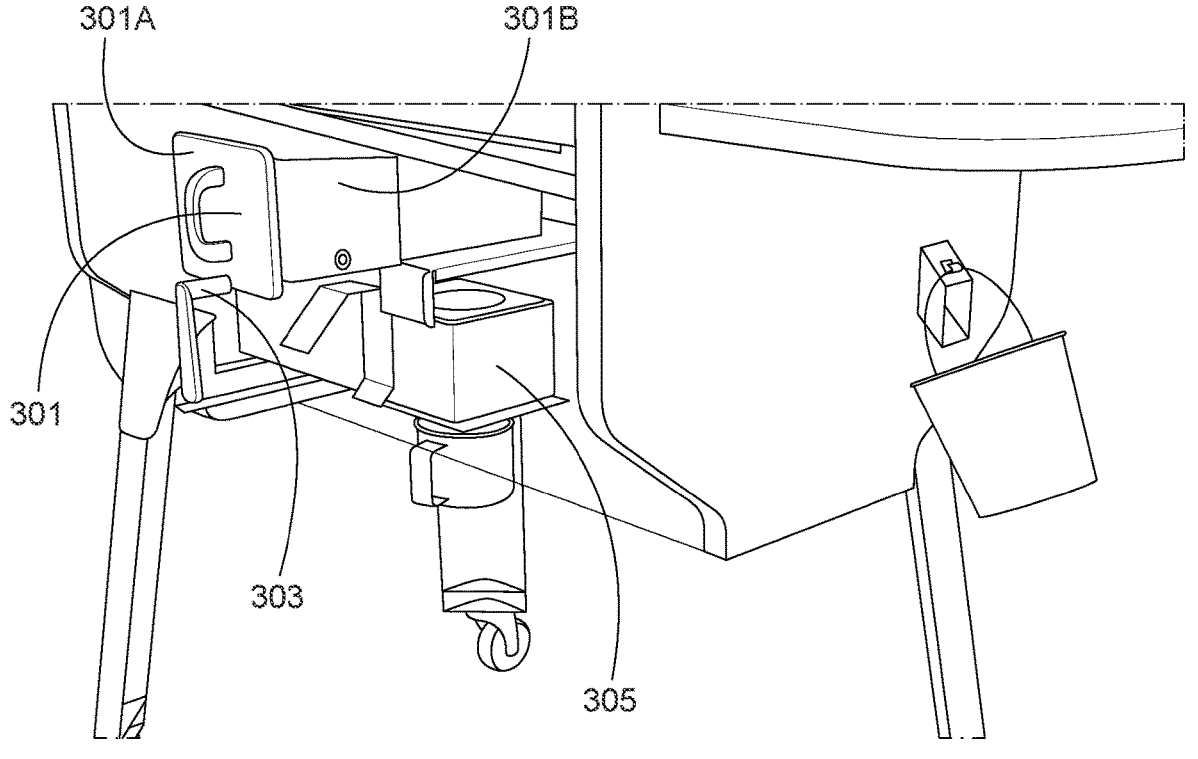
Figure 32:
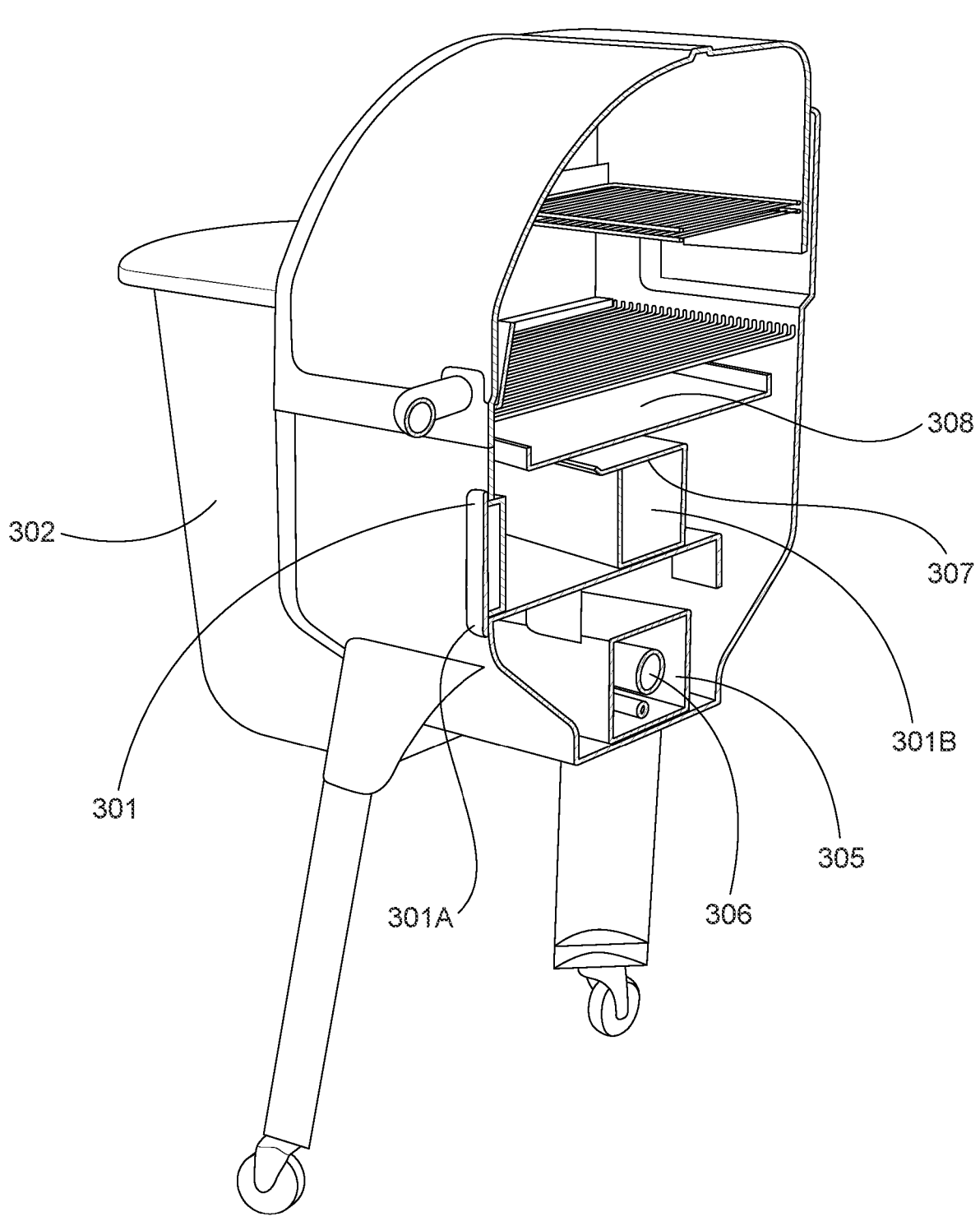
Figure 33:
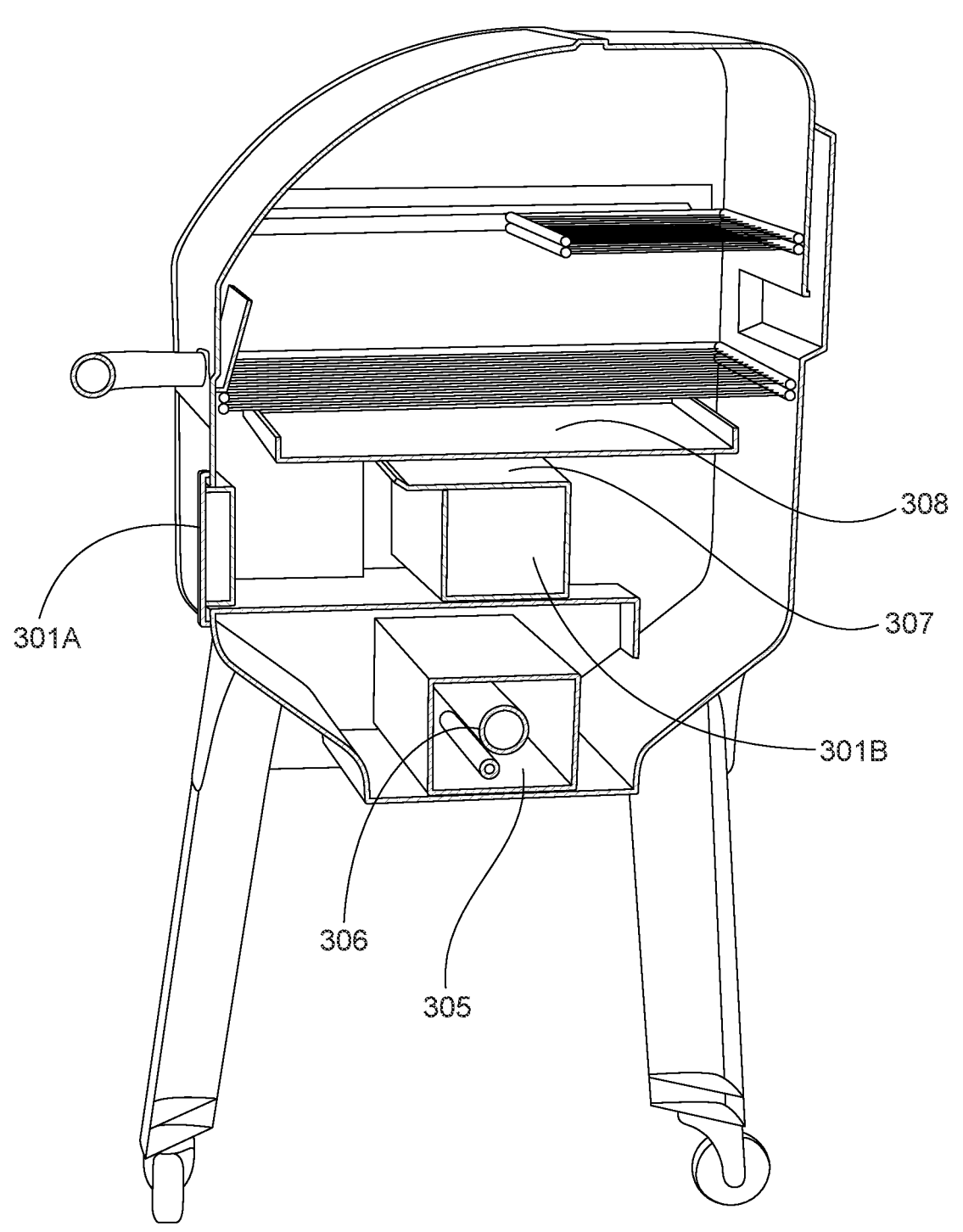
Figure 34:
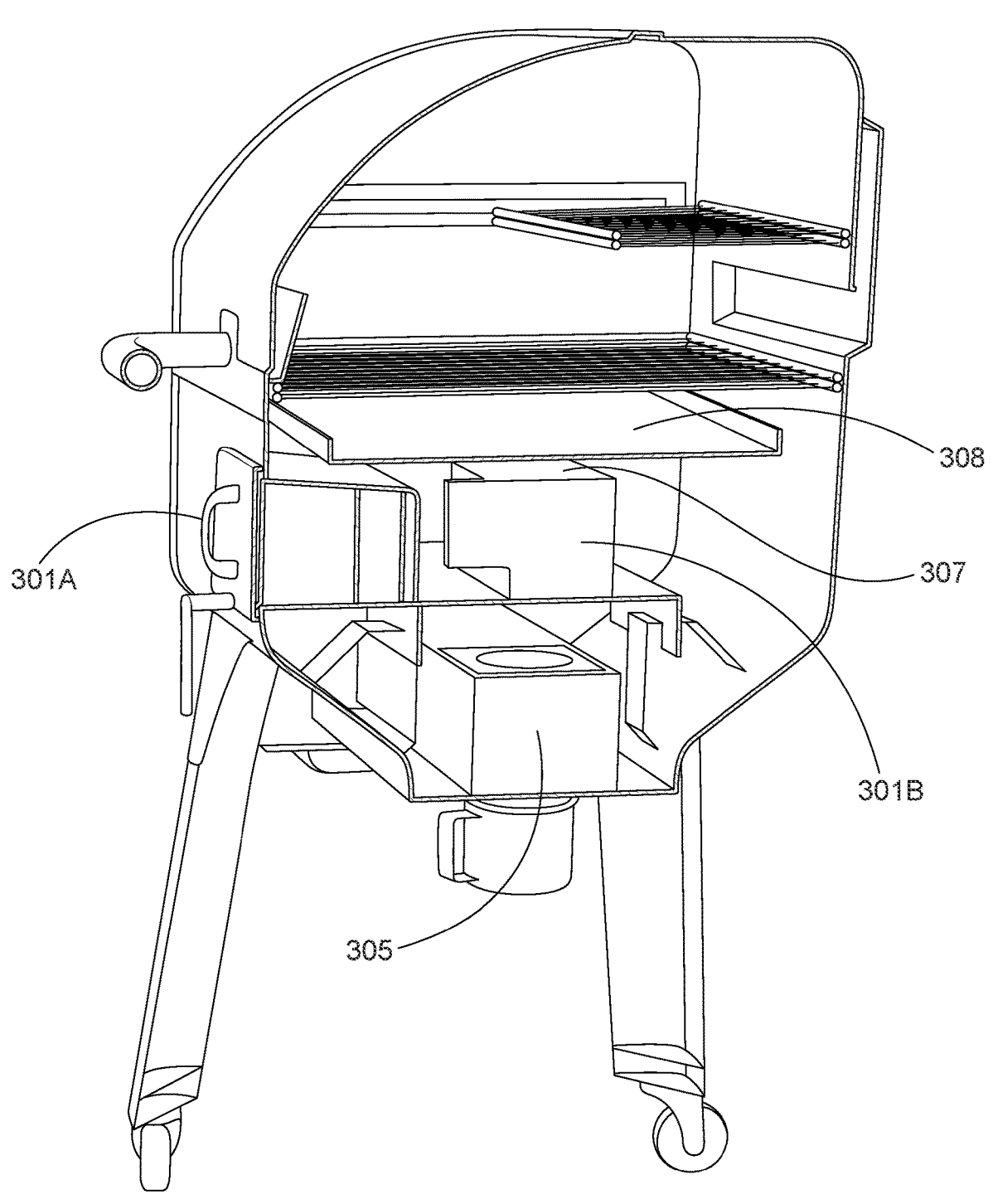
Figure 35:
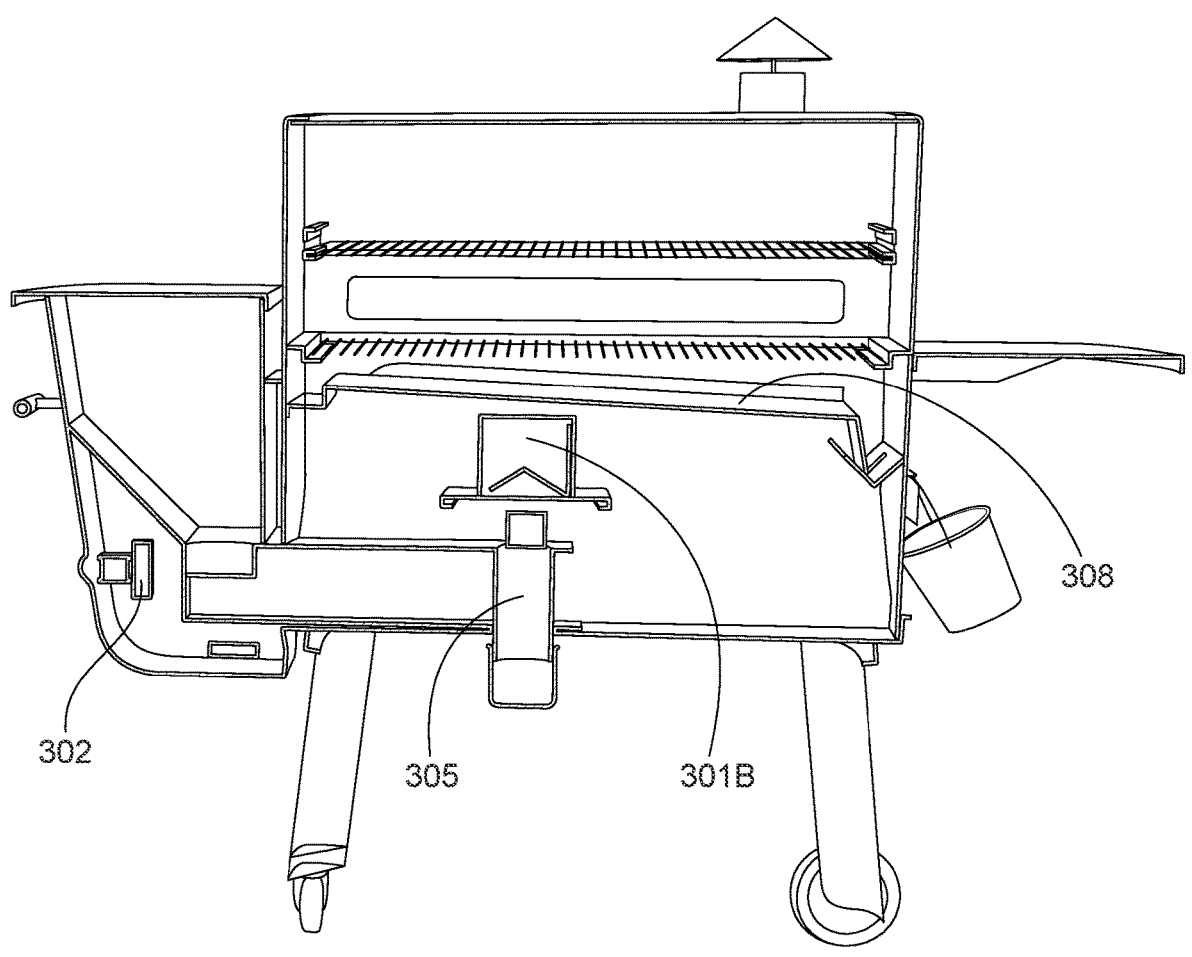
Figure 36:
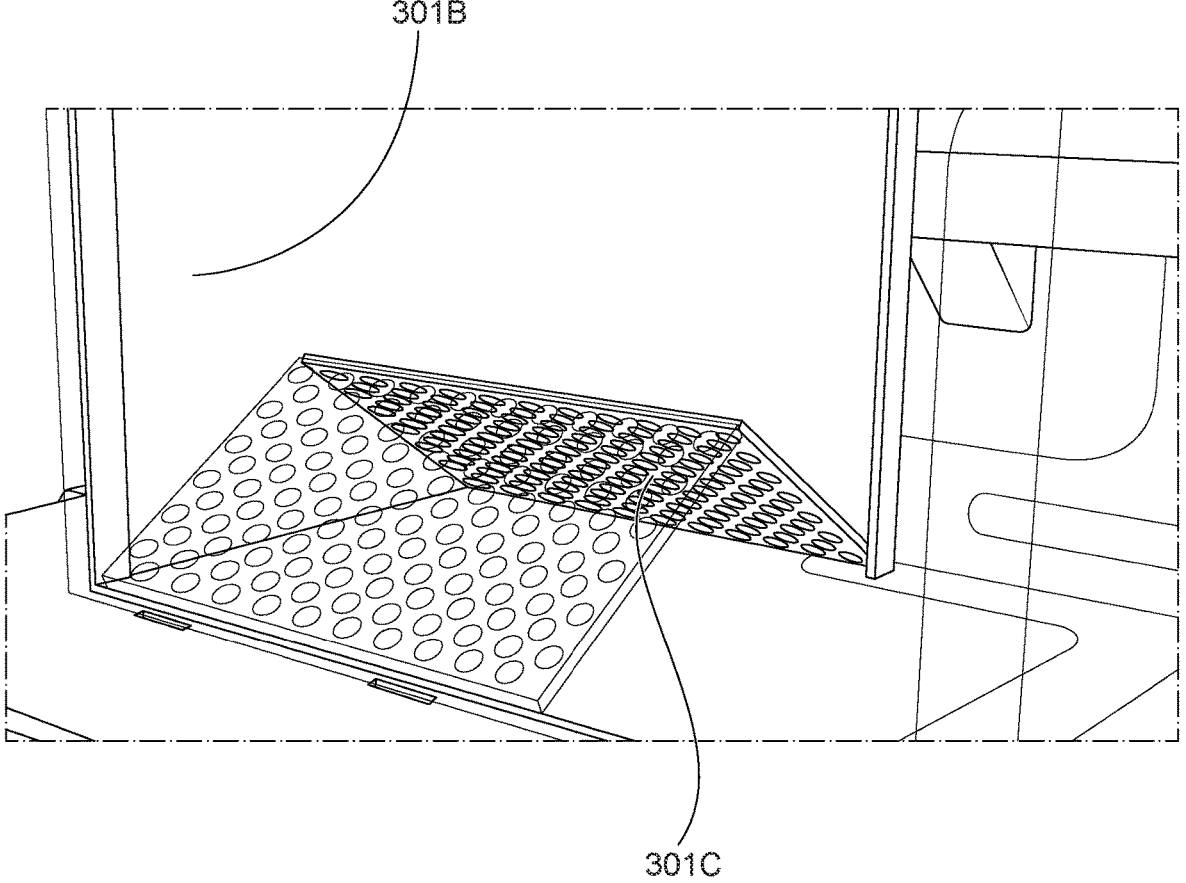
Figure 37:
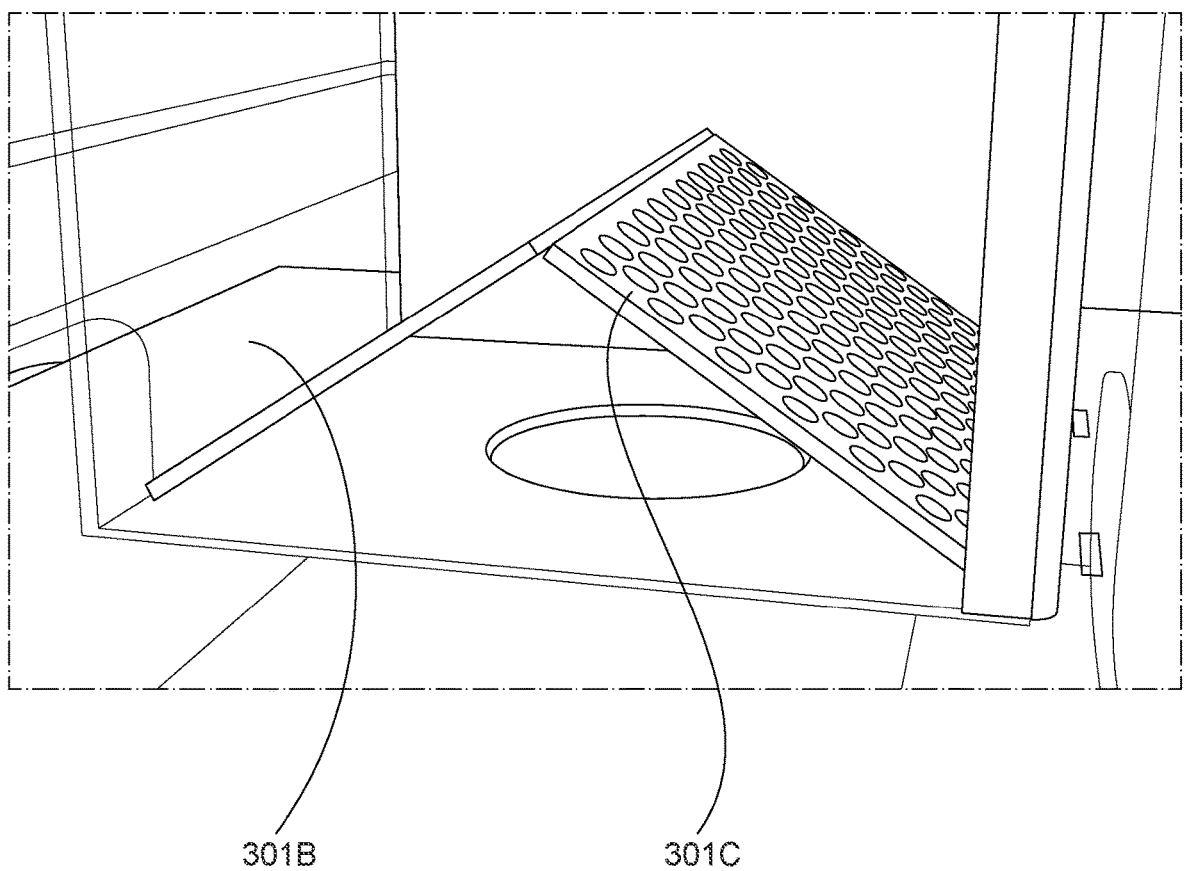

The integrated smoke box 201 includes a handle 201A and a smoke box 201B that actually holds the combustible solid fuel. There is a box support 201C underneath the smoke box 201B that ensures that ash will not fall on the ground when changing the smoke box 201B. As shown in FIGS. 28-29, the box support 201C supports the smoke box 201B when the smoke box 201B is pulled out but not when the smoke box is completely inserted, thereby allowing the opened disc 204 to be used to ignite the solid fuel in the smoke box 201B.

Also shown in FIGS. 28-29 is a ceiling/housing 207 for the smoke box 201B (which does not have a ceiling). The housing 207 for the smoke box 201B allows for controlling flame from the burner and airflow while in use. When the smoke box 201B is slid completely in, the housing 207 seals the top of the smoke box 201B so that it will not smoke as much. The smoke box 201B can be slid out a little to allow more air flow.

Smoke box 201B includes a perforated screen 201E that holds the solid fuel, such as wood or charcoal. It will continuously smolder and provide a second smoke source in addition to the smoke produced by the pellets of the smoker.

FIGS. 30-37 illustrate another cooking device with secondary smoke generation according to an exemplary embodiment. The cooking device shown in these figures is a pellet grill 300 that includes a pellet hopper 302 which feeds pellets to first solid fuel combustion unit 305 within the pellet grill 300 via tube 306 and provides a first source of smoke. The pellet grill 300 additionally includes a secondary solid fuel combustion unit in the form of a removable smoke box 301 that is configured to slide into and out of an opening in the pellet grill/cooking device. The smoke box 301 is removably inserted into the cooking device below a cooking chamber within the smoker and configured to combust a second solid fuel and provide a second source of smoke.

Several of the features shown in pellet grill 300 are similar to those shown with respect to FIGS. 25-29. The integrated stick smoke box 301 allows a user to add charcoal, wood chunks, and/or pellets to the pellet grill 300 to add additional smoke flavor. When using charcoal or wood chunks, this can add more of a traditional smoke flavor to the pellet smoke generated from the combustion of wood pellets by the primary burner.

The integrated smoke box 301 can be opened slightly to allow more air flow so that the solid fuel (e.g., the charcoal or wood) smokes more. Additionally, handle 303 is used to rotate a disc over the burner 305 to allow the direct flame from the pellet burner 235 to ignite the wood or charcoal in the box. The disc is a butterfly valve that lets heat and air up in the smoke box 301B from the burner cup of the burner 305 to start the solid fuel within the smoke box 301B smoking. The handle 303 is typically opened to ignite and then closed. The handle 301A of the integrated smoke box 301 has a gasket attached to seal the chamber so that smoke will go up into the chamber. There is also a gap 301D between the gasket and the handle 301A that improves the air flow of the smoke box.

The integrated smoke box 301 includes a handle 301A and a smoke box 301B that actually holds the combustible solid fuel. The ceiling/housing 307 for the smoke box 301B allows for controlling flame from the burner and airflow while in use. When the smoke box 301B is slid completely in, the housing 307 seals the top of the smoke box 301B so that it will not smoke as much. The smoke box 301B can be slid out a little to allow more air flow.

Smoke box 301B includes a perforated screen 301C that holds the solid fuel, such as wood or charcoal. It will continuously smolder and provide a second smoke source in addition to the smoke produced by the pellets of the pellet grill.

Also shown in FIGS. 30-37, the pellet grill 301 includes a drip tray 308 that vents the smoke from the primary combustion unit (the pellet burner) and also the second combustion unit (the smoke box) to the sides of the pellet grill so that the smoke is not directly hitting the cooking racks within the cooking chamber but rather get routed to the sides of the grill.

Having described and illustrated the principles of our invention with reference to the described embodiments, it will be recognized that the described embodiments can be modified in arrangement and detail without departing from such principles.

It will be appreciated by those skilled in the art that changes could be made to the embodiments described above without departing from the broad inventive concept thereof. For example, the components of the above-described devices could be rearranged or occur in a different series, as understood by those skilled in the art. It is understood, therefore, that this disclosure is not limited to the particular embodiments disclosed, but it is intended to cover modifications within the spirit and scope of the following claims.

The invention claimed is:

1. A wood pellet grill with secondary smoke generation, the wood pellet grill comprising:

a cooking surface comprising one or more cooking racks;

a wood pellet burner positioned below the cooking surface and configured to combust wood pellets and provide a first source of smoke;

a wood pellet hopper configured to store a supply of wood pellets;

an auger configured to feed wood pellets to the wood pellet burner;

a secondary solid fuel combustion unit removably inserted into the cooking device below the cooking chamber and configured to combust a second solid fuel and provide a second source of smoke, wherein the secondary solid fuel combustion unit is removably inserted into a receiving aperture integrated into the cooking device and configured to receive the secondary solid fuel combustion unit;

a hot rod tube integrated into the cooking device and configured to ignite the second solid fuel within the secondary solid fuel combustion unit.

2. The wood pellet grill of claim 1, wherein secondary solid fuel combustion unit comprises a pellet tube.

3. The wood pellet grill of claim 2, wherein the pellet tube is rotatable within the receiving aperture.

4. The wood pellet grill of claim 3, wherein the pellet tube comprises a plurality of holes distributed along a body of the pellet tube and wherein rotation of the pellet tube alters an airflow through the pellet tube.

5. The wood pellet grill of claim 3, wherein the pellet tube comprises a dimple that protrudes through a slot in the receiving aperture, the slot being shaped to restrict movement of the dimple beyond a predetermined angle and prevent further rotation the pellet tube.

6. The wood pellet grill of claim 1, wherein the hot rod tube is further configured to pass through the wood pellet burner and ignite wood pellets in the wood pellet burner.

7. The wood pellet grill of claim 2, further comprising:

a burner housing enclosing the wood pellet burner; and one or more openings in the burner housing configured to blow air onto the pellet tube and thereby keep pellets within the tube smoldering.

8. A cooking device, comprising:

an external housing;

a cooking chamber within the external housing;

a wood pellet burner positioned below the cooking chamber and configured to combust wood pellets and provide a first source of smoke;

a wood pellet hopper configured to store a supply of wood pellets;

an auger configured to feed wood pellets to the wood pellet burner;

a secondary solid fuel combustion unit removably inserted into the cooking device below the cooking chamber and configured to combust a second solid fuel and provide a second source of smoke, wherein the secondary solid fuel combustion unit is removably inserted into a receiving aperture integrated into the cooking device and configured to receive the secondary solid fuel combustion unit; and a valve disposed above the wood pellet burner and below the secondary solid fuel combustion unit, wherein the wood pellet burner is further configured to combust the second solid fuel in the secondary solid fuel combustion unit when the valve is in the open position.

9. The cooking device of claim 8, wherein the valve comprises a butterfly valve and further comprising:

a handle on the external housing configured to actuate the butterfly valve.

10. The cooking device of claim 8, further comprising:

a housing configured to receive the secondary solid fuel combustion unit, the housing comprising a ceiling configured to seal the secondary solid fuel combustion unit when the secondary solid fuel combustion unit is completely inserted into the receiving aperture.

11. The cooking device of claim 8, wherein the cooking device comprises a smoker and wherein the cooking chamber comprises a plurality of cooking racks.

12. The cooking device of claim 8, wherein the cooking device comprises a pellet grill and wherein the cooking chamber comprises at least one cooking rack.

13. The cooking device of claim 8, further comprising:

a drip tray configured to route smoke produced by the wood pellet burner and smoke produced by secondary solid fuel combustion unit to the sides of the cooking device.

* * * * *